(12) United States Patent
Karaoguz et al.

(10) Patent No.: US 8,185,927 B2
(45) Date of Patent: May 22, 2012

(54) VIDEO TRANSMISSION SYSTEM BASED ON LOCATION DATA AND METHODS FOR USE THEREWITH

(75) Inventors: Jeyhan Karaoguz, Irvine, CA (US); Sherman (Xuemin) Chen, San Diego, CA (US); Michael Dove, Los Gatos, CA (US); David Rosmann, Irvine, CA (US); Thomas J. Quigley, Franklin, NC (US); Stephen E. Gordon, Lexington, MA (US)

(73) Assignee: Broadcom Corporation, Irvine, CA (US)

( * ) Notice: Subject to any disclaimer, the term of this patent is extended or adjusted under 35 U.S.C. 154(b) by 466 days.

(21) Appl. No.: 12/060,079

(22) Filed: Mar. 31, 2008

(65) Prior Publication Data

US 2009/0249413 A1    Oct. 1, 2009

(51) Int. Cl.
*H04N 7/16* (2011.01)
*H04N 7/173* (2011.01)

(52) U.S. Cl. .............. 725/105; 725/25; 725/62; 725/63; 725/64; 725/81; 725/82; 725/83; 725/120

(58) Field of Classification Search .................... 725/25, 725/62–64, 74–78, 81–83, 105, 120; 455/410, 455/411

See application file for complete search history.

(56) References Cited

U.S. PATENT DOCUMENTS

| | | | |
|---|---|---|---|
| 5,243,652 A * | 9/1993 | Teare et al. .................... 380/250 |
| 5,621,793 A * | 4/1997 | Bednarek et al. ............. 380/240 |
| 6,009,116 A * | 12/1999 | Bednarek et al. ............. 375/130 |
| 6,016,425 A * | 1/2000 | Bannister .................... 455/432.1 |
| 7,369,868 B2 * | 5/2008 | Dunko et al. ................. 455/517 |
| 7,711,315 B2 * | 5/2010 | Aaltonen et al. ............. 455/3.02 |
| 2001/0037211 A1 * | 11/2001 | McNutt et al. .................... 705/1 |
| 2002/0023010 A1 * | 2/2002 | Rittmaster et al. ............. 705/26 |
| 2003/0126594 A1 * | 7/2003 | Tsuria et al. .................... 725/25 |
| 2003/0177504 A1 * | 9/2003 | Paulo et al. .................... 725/118 |
| 2004/0073915 A1 * | 4/2004 | Dureau ............................ 725/9 |
| 2004/0192254 A1 * | 9/2004 | Choi et al. .................... 455/411 |
| 2004/0203630 A1 * | 10/2004 | Wang .......................... 455/414.1 |
| 2004/0255331 A1 * | 12/2004 | Inoue et al. .................... 725/118 |
| 2005/0028208 A1 * | 2/2005 | Ellis et al. ....................... 725/58 |
| 2005/0113070 A1 * | 5/2005 | Okabe .......................... 455/411 |
| 2005/0234735 A1 * | 10/2005 | Williams .......................... 705/1 |
| 2006/0059096 A1 * | 3/2006 | Dublish et al. .................. 705/57 |
| 2006/0089152 A1 * | 4/2006 | Mahonen .................... 455/456.1 |
| 2006/0155706 A1 * | 7/2006 | Kalinichenko et al. ......... 707/10 |
| 2006/0209770 A1 * | 9/2006 | Monaco et al. ............... 370/338 |
| 2006/0288375 A1 * | 12/2006 | Ortiz et al. ...................... 725/62 |
| 2007/0027809 A1 * | 2/2007 | Alve ............................... 705/51 |
| 2007/0157281 A1 * | 7/2007 | Ellis et al. ..................... 725/134 |
| 2007/0244750 A1 * | 10/2007 | Grannan et al. ................ 705/14 |
| 2007/0266396 A1 * | 11/2007 | Estermann ..................... 725/25 |
| 2007/0291944 A1 * | 12/2007 | Wingert et al. ............... 380/258 |
| 2008/0034393 A1 * | 2/2008 | Crayford ......................... 725/87 |
| 2008/0034444 A1 * | 2/2008 | Sears .............................. 726/29 |
| 2008/0092157 A1 * | 4/2008 | Walter et al. .................... 725/25 |
| 2008/0155607 A1 * | 6/2008 | Klappert ......................... 725/58 |
| 2008/0201731 A1 * | 8/2008 | Howcroft ........................ 725/13 |
| 2008/0207165 A1 * | 8/2008 | Eckhart ......................... 455/410 |
| 2009/0070319 A1 * | 3/2009 | Hronopoulos .................... 707/5 |

\* cited by examiner

*Primary Examiner* — Son P Huynh
(74) *Attorney, Agent, or Firm* — Garlick & Markison; Bruce E. Stuckman

(57) ABSTRACT

A video transmission system includes a transceiver module that receives location data from a remote device and that transmits a video signal to the remote device. A network module receives a video stream from a video source and that generates the video signal based on the location data.

4 Claims, 18 Drawing Sheets

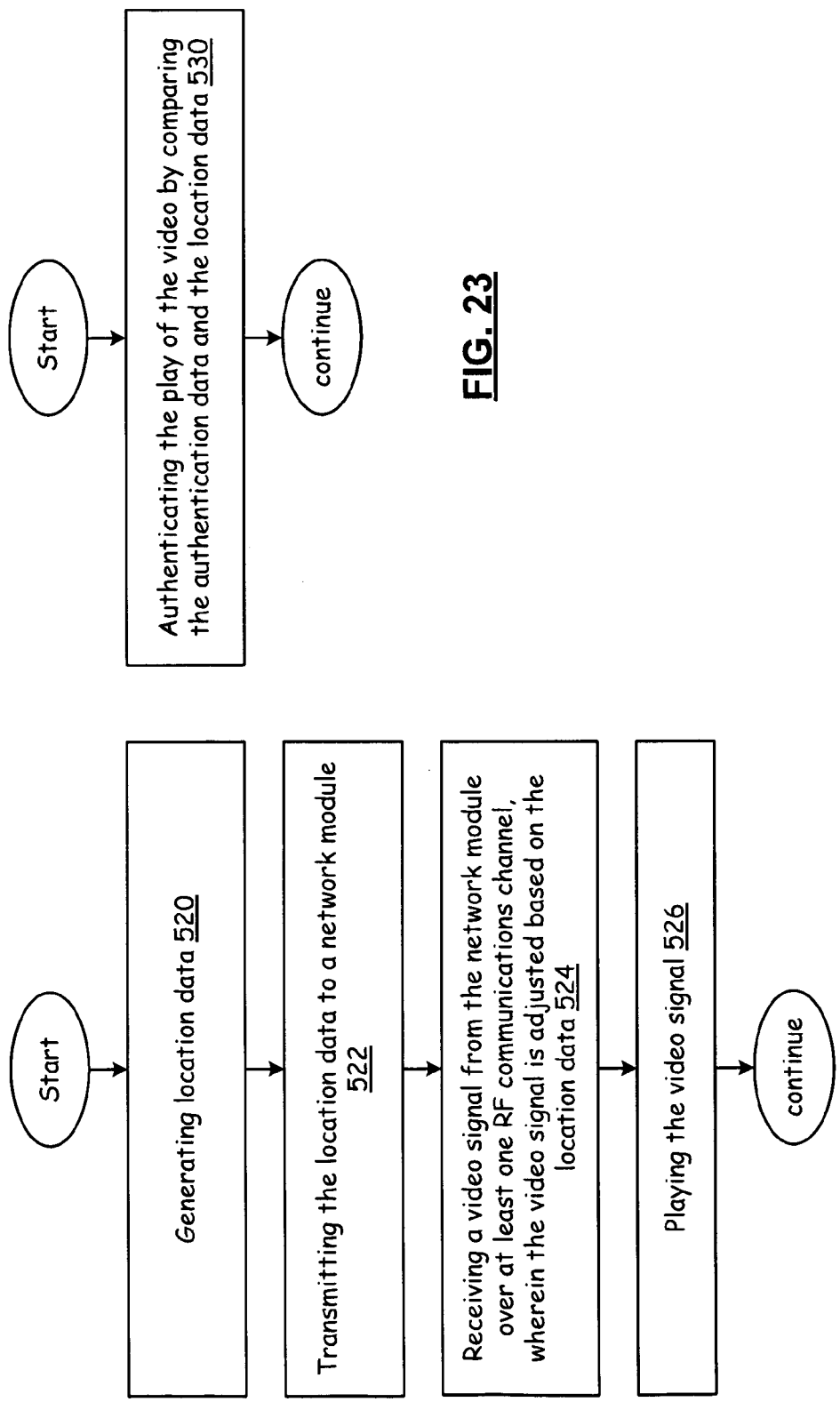

VIDEO TRANSMISSION SYSTEM BASED ON LOCATION DATA AND METHODS FOR USE THEREWITH

CROSS-REFERENCE TO RELATED APPLICATIONS

The present application is related to the following U.S. patent applications:

VIDEO TRANSMISSION SYSTEM WITH EDGE DEVICE FOR ADJUSTING VIDEO STREAMS BASED ON DEVICE PARAMETERS AND METHODS FOR USE THEREWITH, having Ser. No. 12/058,933, filed on Mar. 31, 2008;

VIDEO TRANSMISSION SYSTEM WITH TIMING BASED ON A GLOBAL CLOCK AND METHODS FOR USE THEREWITH, having Ser. No. 12/059,028, filed on Mar. 31, 2008;

VIDEO TRANSMISSION SYSTEM WITH AUTHENTICATION BASED ON A GLOBAL CLOCK AND METHODS FOR USE THEREWITH, having Ser. No. 12/059,327, filed on Mar. 31, 2008; and MOBILE VIDEO DEVICE WITH ENHANCED VIDEO NAVIGATION, having Ser. No. 12/060,131, filed on Mar. 31, 2008.

BACKGROUND OF THE INVENTION

1. Technical Field of the Invention

This invention relates generally to the transmission and processing of video signals and devices that use such video signals.

2. Description of Related Art

Communication systems provide several options for obtaining access to broadcast video content. Consumers can receive broadcast standard definition and high definition television broadcasts from the air with an antenna. Analog and digital cable television networks distribute a variety of television stations in most communities on a subscription basis. In addition, satellite television and new internet protocol (IP) television services provide other subscription alternatives for consumers. Analog video signals can be coded in accordance with a number of video standards including NTSC, PAL and SECAM. Digital video signals can be encoded in accordance with standards such as Quicktime, (motion picture expert group) MPEG-2, MPEG-4, or H.264. In addition to digital coding, some video signals are scrambled to provide access to these signals, only to the subscribers that have paid to access the particular content.

The desire for video content has driven cellular telephone networks to begin offering video programs to their subscribers as streaming video. In this fashion, users of mobile devices can have access to video programming on the go. Some of the techniques used in providing broadcast video content to stationary devices are not suitable for adaptation to the viewing environment associated with a handheld mobile device.

The limitations and disadvantages of conventional and traditional approaches will become apparent to one of ordinary skill in the art through comparison of such systems with the present invention.

BRIEF SUMMARY OF THE INVENTION

The present invention is directed to apparatus and methods of operation that are further described in the following Brief Description of the Drawings, the Detailed Description of the Invention, and the claims. Other features and advantages of the present invention will become apparent from the following detailed description of the invention made with reference to the accompanying drawings.

BRIEF DESCRIPTION OF THE SEVERAL VIEWS OF THE DRAWING(S)

FIG. 1 presents a block diagram representation of a video network 102 in accordance with an embodiment of the present invention;

FIG. 2 presents a block diagram representation of a video network 102 in accordance with another embodiment of the present invention;

FIG. 3 presents a block diagram representation of a video processing system 125 in accordance with an embodiment of the present invention;

FIG. 4 presents a block diagram representation of a video processing system 125' in accordance with another embodiment of the present invention;

FIG. 5 presents a block diagram representation of a mobile video device 110 in accordance with an embodiment of the present invention;

FIG. 6 presents a block diagram representation of a mobile video device 110' in accordance with another embodiment of the present invention;

FIG. 7 presents a block diagram representation of a mobile video device 111 in accordance with another embodiment of the present invention;

FIG. 8 presents a pictorial representation of a mobile device 200 in accordance with another embodiment of the present invention;

FIG. 9 presents a pictorial representation of a mobile device 200 in accordance with another embodiment of the present invention;

FIG. 22 is a flowchart representation of a method in accordance with the present invention;

FIG. 23 is a flowchart representation of a method in accordance with the present invention;

DETAILED DESCRIPTION OF THE INVENTION

Figure 1:
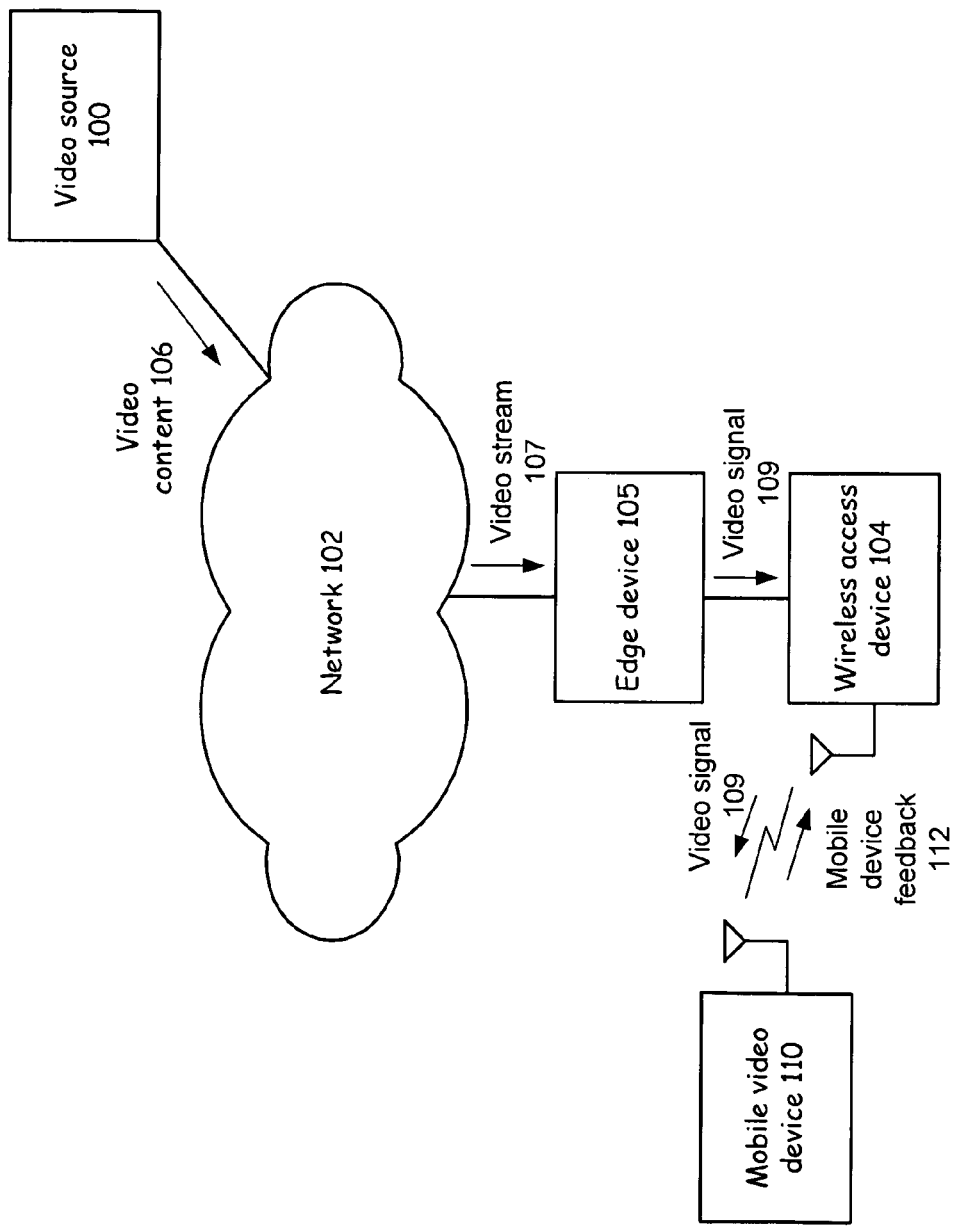

FIG. 1 presents a block diagram representation of a video network 102 in accordance with an embodiment of the present invention. A network 102 is shown that distributes information such as video content 106 from a video source 100 to a wireless access device 104 for wireless transmission to wireless video devices such as mobile video device 110 or other video devices. The video content 106 can include movies, television shows, commercials or other ads, educational content, infomercials, or other program content and optionally additional data associated with such program content including but not limited to digital rights management data, control data, programming information, additional graphics data and other data that can be transferred in associated with program content. Video content 106 can include video with or without associated audio content. The video content 106 can be sent as broadcast video, streaming video, video on demand and near video on demand programming and/or other formats.

The network 102 can be a dedicated video distribution network such as a direct broadcast satellite network or cable television network that distributes video content 106 from a plurality of video sources, including video source 100, a plurality of wireless access devices and optionally wired devices over a wide geographic area. In the alternative, network 102 can be a heterogeneous network that includes one or more segments of a general purpose network such as the Internet, a metropolitan area network, wide area network, local area network or other network and optionally other networks such as an Internet protocol (IP) television network.

The video content 106 can be carried as analog signals such as National Television System Committee (NTSC), Séquentiel couleur à mémoire (SECAM) or Phase Alternating Line (PAL) coded video signals, or digital video signals such as Quicktime, (motion picture expert group) MPEG-2, MPEG-4, H.264, or other format, either standard or proprietary that are carried via an IP protocol such as TCP/IP, Ethernet protocol, Data Over Cable Service Interface Specifications (DOCSIS) protocol or other protocol.

Wireless access device 104 can include a base station or access point that provides video content 106 to a plurality of video subscribers over a cellular network such as an Universal Mobile Telecommunications System (UMTS), enhanced data rates for GSM evolution (EDGE), 3G, 4G or other cellular data network, a wireless local area network (WLAN) such as an 802.11a,b,g,n, WIMAX, or other WLAN network. In addition, the wireless access device can include a home gateway, video distribution point in a dedicated video distribution network or other wireless gateway for wirelessly transmitting video content 106, either alone or in association with other data, signals or services, to mobile video device 110 and/or video device 112.

Mobile video device 110 can include a video enabled wireless telephone or other handheld communication device with wireless connectivity via a wireless data card, wireless tuner, WLAN modem or other wireless link or device that alone or in combination with other devices is capable of receiving video content 106 from wireless access point 104 and storing and/or displaying the video content 106 for a user.

Edge device 105 can include a server, router, such as an edge router, switch, hub, gateway, interworking device or other network module that receives a video stream 107 that contains video content 106 and processes the video stream 107 to produce a video signal 109 for transmission to the mobile video device 110. In an embodiment of the present invention, the edge device 105 receives mobile device feedback 112 such as a device parameter, power state, measurements of channel characteristics, location data or other data that can be used by edge device 105 in the processing of video stream 107.

The video source 100, network 102, wireless access device 104, mobile video device 110 and/or edge device 105 includes one or more features of the present invention that will be described in greater detail in conjunction with FIGS. 2-26 that follow.

Figure 2:
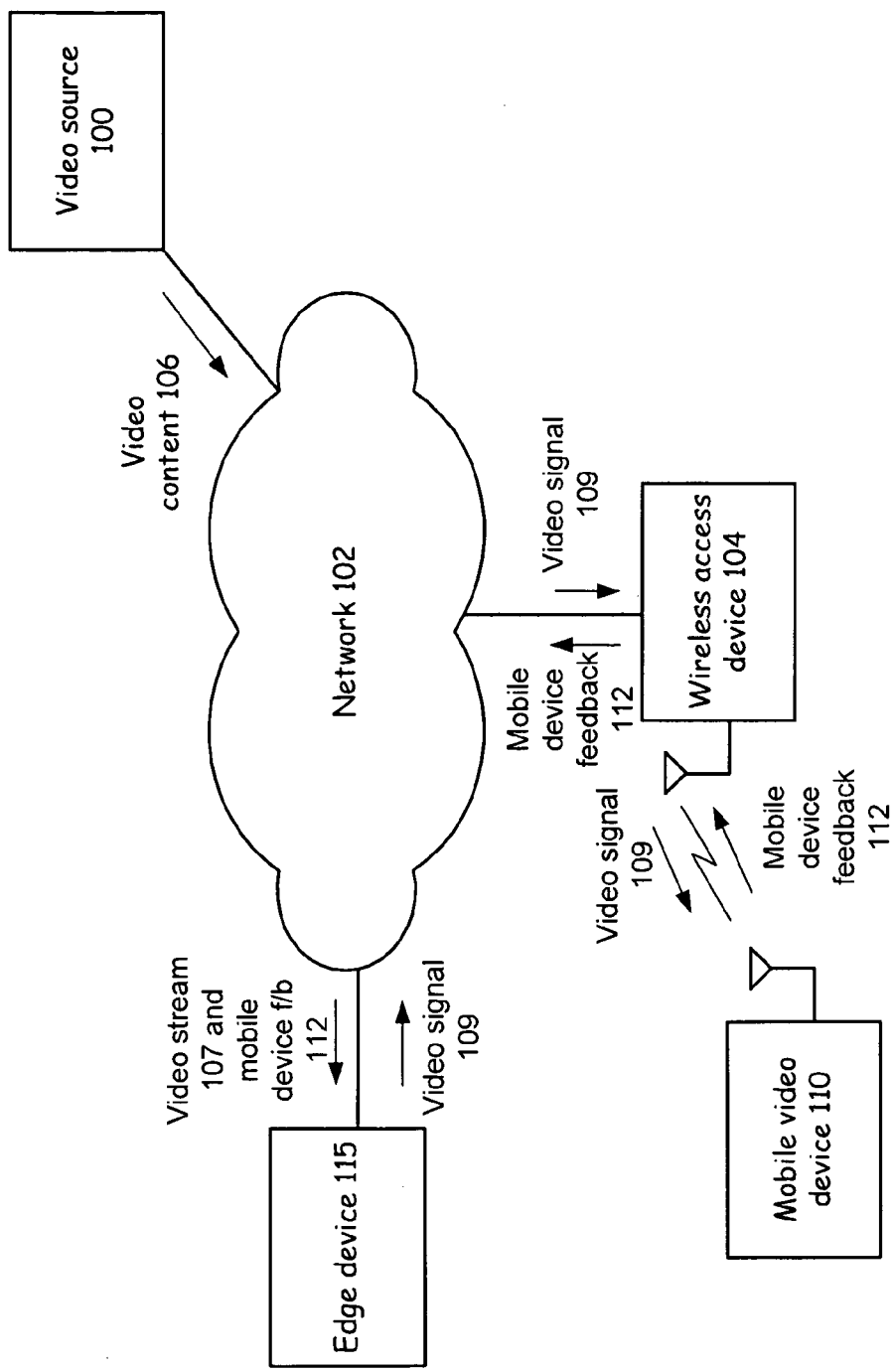

FIG. 2 presents a block diagram representation of a video network 102 in accordance with another embodiment of the present invention. In particular, a network diagram is shown that includes many similar elements to the network of FIG. 1 that are referred to by common reference numerals In addition, edge device 115 operates as edge device 105, yet is located remotely from wireless access device 104. In this configuration, portions of network 102 transport video signal 109 and mobile device feedback 112 between edge device 115 and wireless access device 104. While edge device 115 is shown as being connected to, but apart from, network 102, edge device 115 can be considered as part of network 102, particularly in a configuration where network 102 is a heterogeneous network and edge device 115 includes an edge router, gateway, hub or interworking device that converts a video stream 107 from a first format, such as a first digital format used in one portion of the heterogeneous network, to another format, such as MPEG-2, H.264 or other digital format used to communicate with wireless access device.

The video source 100, network 102, wireless access device 104, mobile video device 110 and/or edge device 105 include one or more features of the present invention that will be described in greater detail in conjunction with FIGS. 3-24 that follow.

Figure 3:
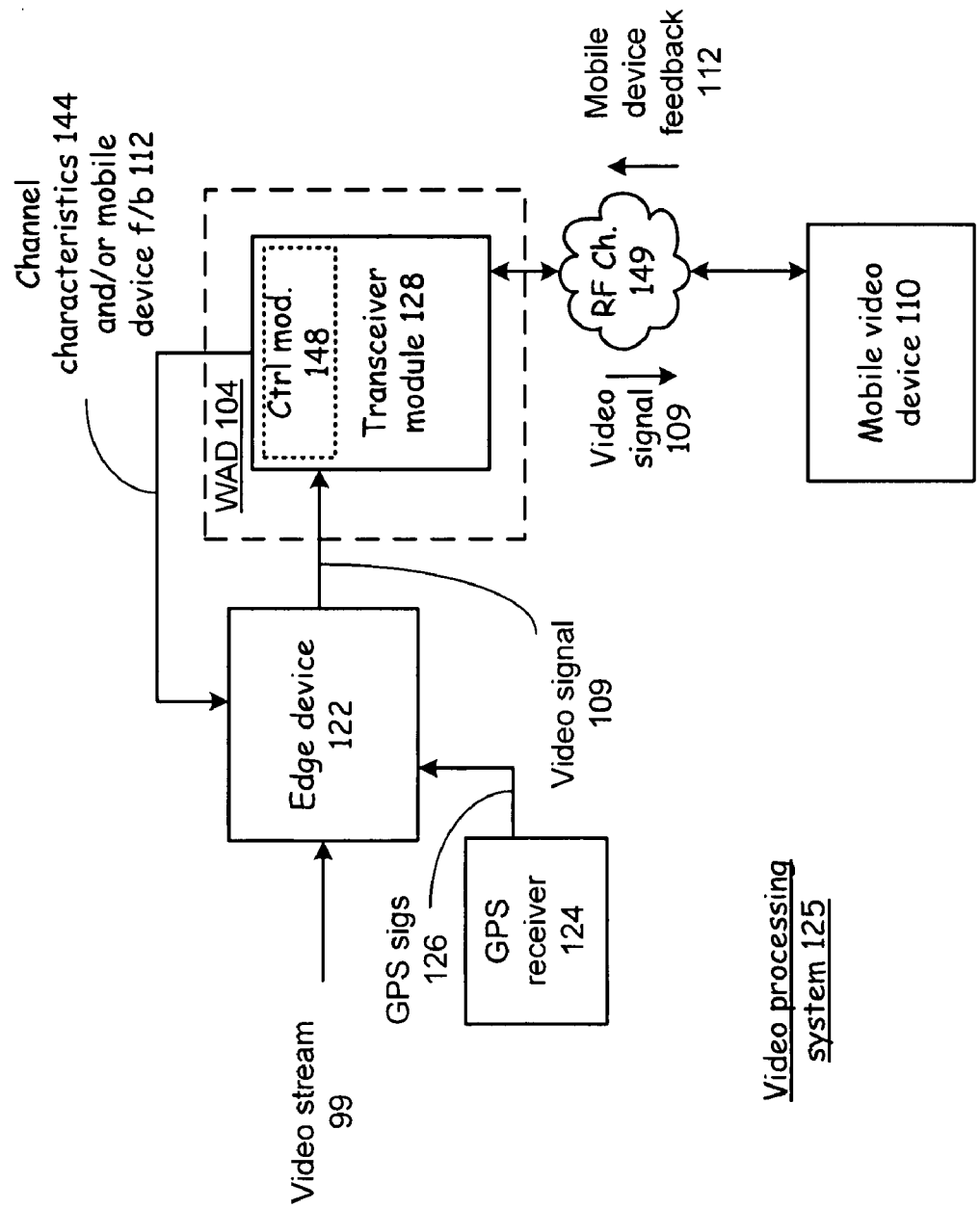

FIG. 3 presents a block diagram representation of a video processing system 125 in accordance with an embodiment of the present invention. A video processing system 125 is shown that can be used in conjunction with network 102.

Edge device 122, such as edge device 105 or 115 processes video stream 99, such as video stream 107 or other video stream that includes video content 106, to produce video signal 109, optionally based on mobile device feedback 112. In an embodiment of the present invention, edge device 122 can include a video encoder or transcoder that is implemented using one or more microprocessors, micro-controllers, digital signal processors, microcomputers, central processing units, field programmable gate arrays, programmable logic devices, state machines, logic circuits, analog circuits, digital circuits, and/or any devices that manipulates signals (analog and/or digital) based on operational instructions that are stored in a memory module. When edge device 122 is implemented with two or more devices, each device can perform the same steps, processes or functions in order to provide fault tolerance or redundancy. Alternatively, the function, steps and processes performed by edge device 122 can be split between different devices to provide greater computational speed and/or efficiency. The associated memory module may be a single memory device or a plurality of memory devices. Such a memory device may be a read-only memory, random access memory, volatile memory, non-volatile memory, static random access memory (SRAM), dynamic random access memory (DRAM), flash memory, cache memory, and/or any device that stores digital information. Note that when the edge device 122 implements one or more of its functions via a state machine, analog circuitry, digital circuitry, and/or logic circuitry, the memory module storing the corresponding operational instructions may be embedded within, or external to, the circuitry comprising the state machine, analog circuitry, digital circuitry, and/or logic circuitry.

Wireless access device 104 includes transceiver module 128 that creates RF signals containing the video signal 109 for transmission to mobile video device 110 via one or more RF communication channels 149. As discussed above, edge device 105 can receive mobile device feedback 112 from mobile device 110 via wireless access device 104. In operation, edge device 105 can generate video signal 109 by adjusting video stream 99 based on the mobile device feedback 112. In this fashion, a video signal 109 can be transmitted to mobile video device 110 that is formatted based on the particular characteristics of that device, adapts to the particular channel conditions, includes authentication data that is based on the timing used by the mobile communication device or based on its location, etc.

In an embodiment of the present invention, the mobile video feedback 112 includes a device parameter. In one example, the mobile device feedback 112 includes a device resolution, a screen size, and/or other display setting that is either inherent to the capabilities of the mobile device, have been established by the user of the device based on display preferences or that are particular to an anticipated reception of video signal 109 or display settings that have been established by the mobile device itself based on current channel characteristics, power state, error rates, bandwidth, etc. In this fashion, the edge device 122 can generate a video signal 109 from video stream 107 with a frame rate, pacing, color depth, data rate, encoding format and/or resolution that a particular mobile device 110 requires or desires to receive.

In additional mode of operation, the transceiver module 128 includes a control module 148 that generates one or more channel characteristics 144 based on the conditions of RF channel 149. In particular, control module 148 monitors a signal to noise ratio, signal to noise and interference ratio, a bit error rate, packet error rate, or other channel characteristic and generates a one or more channel characteristics 144 in response thereto. In this mode of operation, the edge device 122 adjusts the video stream 99 to generate video signal 109 based on the channel characteristic 144 as well as other factors such as mobile device feedback 112. For instance, when the channel characteristics are unfavorable, one or more video parameters such as the bandwidth, frame rate, color depth or resolution can be reduced by edge device 122 and/or the error detection and correction can be increased by transceiver module 148 to facilitate accurate decoding of the video signal 109 by the mobile device 110.

In an additional mode of operation, the mobile device feedback 112 includes a decoding error feedback parameter that indicates a frequency or amount of decoding errors currently present in the decoding of the video signal 109. As described in conjunction of the use of optional channel characteristics 144, when the decoding error feedback parameter indicates that the channel characteristics are unfavorable, one or more video parameters of video signal 109 such as the bandwidth, frame rate, color depth or resolution can be reduced by edge device 122 and/or the error detection and correction can be increased by transceiver module 148 to facilitate accurate decoding of the video signal 109 by the mobile device 110.

In a further mode of operation, mobile device 110 generates mobile device feedback 112 that indicates a power state of the device. For example, when the mobile device is powered by a battery and enters a low power state, edge device 112 can adjust video stream 99 to generate video signal 109 with a reduced bandwidth, frame rate color depth, resolution or for black and white operation to conserve power at the mobile device. Further, in a circumstance where video stream 99 includes video content 106 such as show, movie or other program with a duration or remaining duration if the video content 106 is in progress, edge device 122 can respond to a mobile device feedback 112 that includes a remaining battery life to generate video signal 109 by adjusting the video parameters of video stream 99 to allow the mobile device to conserve enough power to view the video content 106 to its end, if possible. For example, if the mobile device feedback 112 indicates that the mobile device 110 has only 10 minutes of remaining battery life at present consumption and the video content 106 is a movie that has 12 minutes yet to run, the edge device 122 can adjust the video parameters of video signal 109 to conserve power in the mobile device—allowing the all 12 remaining minutes of the video content 106 to be viewed.

In an embodiment of the present invention, edge device 122 is coupled to or otherwise includes a global position system (GPS) receiver 124 that generates network global positioning system (GPS) signals 126. In operation, GPS receiver 124 is coupled to recover a plurality of coarse/acquisition (C/A) signals and a plurality of navigation messages from received GPS signals from one or more orbiting satellites. The GPS receiver 124 utilizes the C/A signals and the navigation messages to determine the position of the GPS receiver 124 and generate GPS signals 126 that contain GPS position/location data, clock signals and/or real-time time and date derived from the atomic clocks onboard one or more GPS satellites.

In a mode of operation, the edge device 122 uses one or more clock signals from the GPS receiver 124 as a global clock to aide in synchronizing the transmission of the video signal 109 with its reception by a mobile device 110 that is also equipped with a GPS receiver and therefore also has access to the same global clock. In particular, edge device 122 can generate video signal 109 based on a clock signal derived from a global clock signal included in GPS signals 126. If mobile video device 110 is equipped with its own GPS receiver, it can receive and decode the video signal 109 based on the same global clock. In this fashion, the transmitting and receiving clock can be synchronized in frequency reducing or eliminating jitter.

In addition or in the alternative, edge device 122 can include time stamps in video signal 109 that are generated based on the global clock signal. When mobile video device is equipped with its own GPS receiver, the video signal 109 can be decoded and played based on local timing generated by its own local GPS signals that include signals generated by the same global clock. For example, mobile video device 110 can generate mobile device feedback 112 that indicates that it is equipped with a local GPS receiver and that local GPS signals are available. In response, edge device 122 can generate video signal 109 with timing and time stamps that are based on a global clock signal included in GPS signals 126. In addition, edge device 122 can optionally reduce the frequency of the time stamps included in video signal 109, since the timing between edge device 122 and mobile video device 110 is based on a common global clock and is presumably more accurate than ordinary timing.

In an embodiment of the present invention, edge device 122 further uses timing data derived from GPS signals 126 to generate authentication data included in video signal 109. In particular, edge device 122 can obtain real-time clock signals such as time and date from the GPS receiver 124 in GPS signals 126. This time and date can be included in the video signal 109. Mobile video device 110 can include an authentication routine that compares the time and date from the authentication data to its own time and date, such as a time and date generated locally by its own GPS receiver. If the time and date included in the authentication data compare favorably to locally generated timing (such as when the locally generated time and date and the authentication data varies by less than an authentication threshold, the video signal 109 can be authenticated and the playback of video signal by mobile video device 110 can be enabled. If however, the time and date included in the authentication data vary from the locally generated time and date by more than the authentication threshold, the playback of the video content mobile video device 110 can be disabled.

The authentication threshold can be 5 seconds, 10 seconds, one minute or a shorter or longer period based on the desired level of security, the expected latency of transmission and decoding, etc. In this fashion, video content can be transmitted with authentication to compatible receivers for real-time display only. In a further embodiment, a much longer authentication threshold, such as one day, one week, etc, can likewise be used to allow storage of the video signal 109 and playback within the allotted period. As described above, the authentication data can indicate the time that the data was transmitted, however, the authentication data can itself include an authorized time period when a user can play the video signal and/or a number of times the user can play the video signal. When local time and data fall within the authorized time period and the number of times the video has been played has not been violated the video signal 109 can be authenticated and the playback of video signal by mobile video device 110 can be enabled. If however, the local time and date fall outside of the authorized time period or the number of times that a video can be played has been exceed, the playback of the video signal by the mobile video device 110 can be disabled.

In an embodiment of the present invention, mobile device feedback 112 includes location data from the mobile device that is used by edge device 122 in presenting video signal 109. In one mode of operation, the edge device 122 restricts the transmission of video signal 109 to include or exclude certain geographical areas, modifies the fee charged in association with the presentation of video content included in video signal 109 based on the geographical area and/or adjusts one or more video parameters when generating video signal 109 based on the geographical location that the video signal 109 will be transmitted.

For example, the transmission of particular content 106 may be geographically restricted. In this instance, edge device 122 only generates video signal 109 and/or enables transmission when the location data received in mobile device feedback 112 corresponds to an allowed area. In this fashion, video signal 109 can be prevented from being transmitted to black-out cities, countries or other geographical areas.

In another example, the fee charged can be varied based on the particular location. For instance, the location data can be compared to a rate table associated with edge device 122 and a billing record can be generated that corresponds to the location of the mobile video device 110. Further, the resolution, frame rate, bandwidth, digital format or other video parameters of the video signal can be adjusted based on the location data, for instance to correspond to the capabilities of the RF channel 149 at that particular location. In addition, high quality presentations of video signal 109 may only be allowed in certain geographical areas, and the overall quality of the video signal (as reflected in a choice of video parameters used to generate video signal 109) can be varied to correspond to the particular location of the mobile video device 110 as reflected by the location data received by edge device 122.

In an embodiment of the present invention, the location data received via mobile device feedback 112 can be used to generate location-based authentication data that is embedded in the video signal 109. Mobile video device 110 can include an authentication routine that compares the location data from the authentication data to its own location data generated locally by its own GPS receiver. If the location data included in the authentication data compare favorably to locally generated location data the video signal can be authenticated and the playback of video signal 109 by mobile video device 110 can be enabled. If however, the location data included in the authentication data vary from the locally location data by more than an authentication threshold such as 1 mile, 5 miles or some greater or lesser distance based on the desired level of security, the playback of the video signal 109 by the mobile video device 110 can be disabled. In this fashion, video content 109 can be transmitted with authentication to compatible receivers for display only when the mobile video device is within a certain geographical range. If, for instance, the video signal 109 were received, stored and transferred to another device with compatible authentication at another location, the authentication routine would prevent the playback of the video signal 109.

Figure 4:
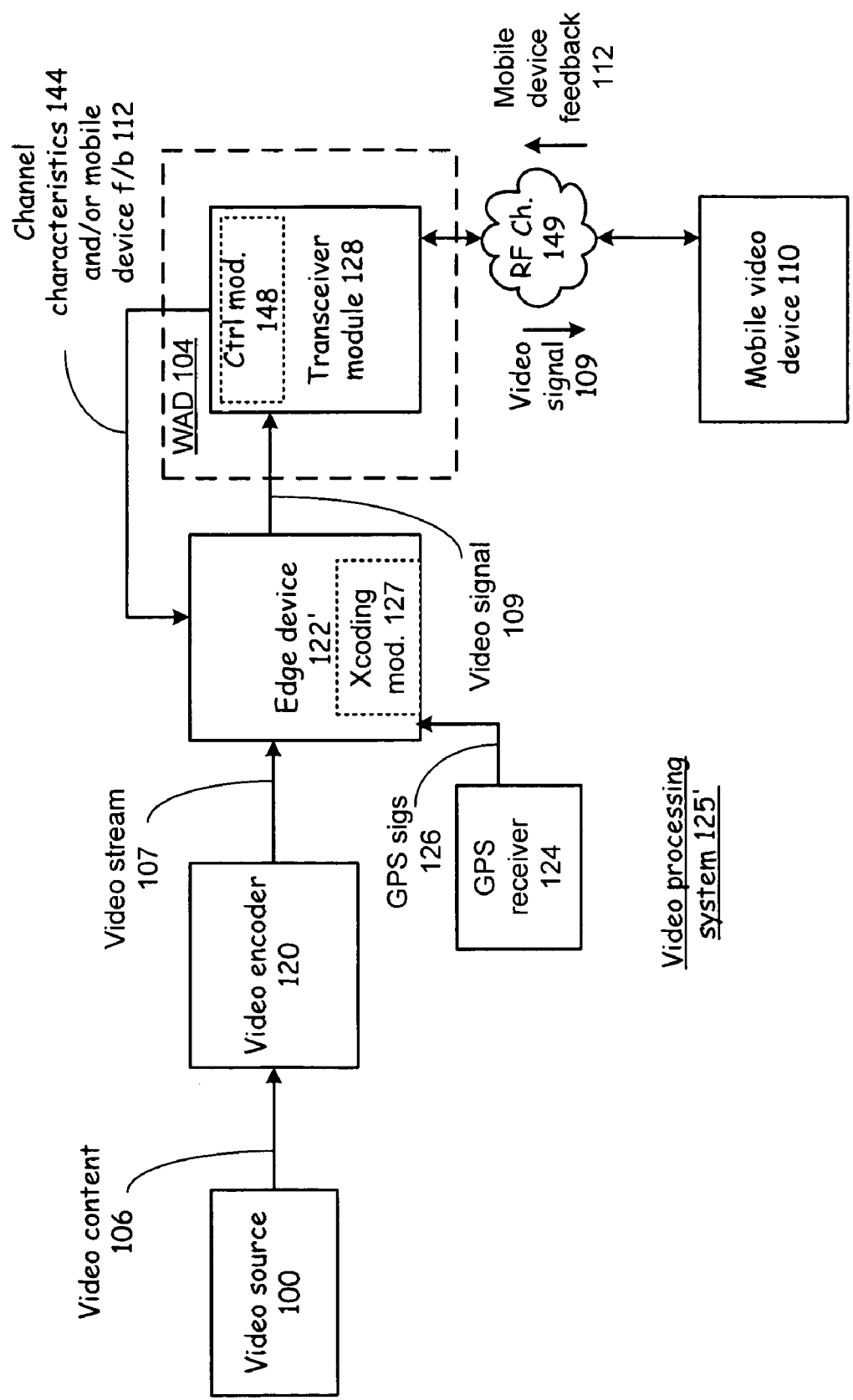

FIG. 4 presents a block diagram representation of a video processing system 125' in accordance with an embodiment of the present invention. A video processing system 125' is shown that can be used in conjunction with network 102. In particular a video processing system is shown that includes similar elements to the video processing system 125 presented in conjunction with FIG. 3 that are referred to by common reference numerals. In addition, video processing system 125' includes a video encoder 120 that encodes a video stream that includes video content 106 into a video stream 107. While shown as separate from video source 100, video encoder 120 can be incorporated into video source 100 or can be downstream of the video source 100 in network 102. For instance, encoder 120 can be incorporated in a head-end, video server, edge router, video distribution center, or any other network element of network 102. In this embodiment, edge device 122 includes a transcoding module 127 that optionally generates the video signal 109 by transcoding the video stream 107 from a first video format to a second video format. The use of transcoding module 127 provides additional flexibility in edge device in adjusting the video parameters of video signal 107 when generating video signal 109 as well as altering the overall format when generating video signal 109.

Figure 5:
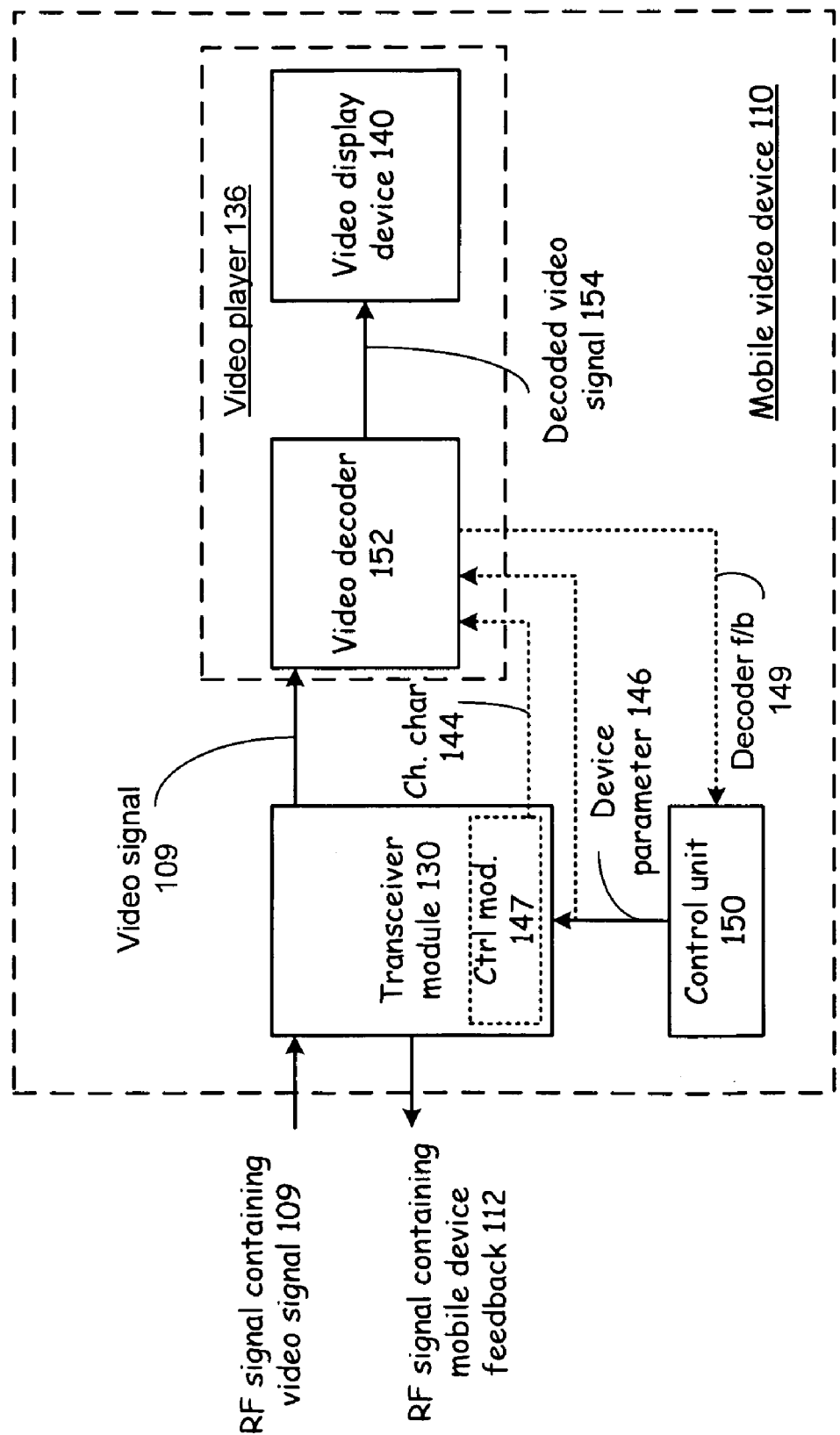

FIG. 5 presents a block diagram representation of a mobile video device 110 in accordance with an embodiment of the present invention. Mobile video device 110 includes a transceiver module 130 that receives RF signals containing the video signal 109 and that demodulates and down converts these RF signals to extract the video signal 109. Video player 136 includes a video decoder 152 that generates a decoded video signal 154 and a video display device 140, such as plasma display, LCD display, cathode ray tube (CRT), that either directly or via projection, creates a video display for an end-user.

In an embodiment of the present invention, video decoder 152 optionally operates in a plurality of modes of operation. These modes of operation can be selected based on a device parameter 146 received from optional control unit 150 to conform the decoding of the video signal 109 to the particular characteristics or the particular state of the device video signal 109 and the color scale, resolution and/or frame rate, based on a particular device state, such as the power state of the device.

In particular, video decoder 152 produces a decoded video signal from the video signal 109, based on the device parameter 146 provided by control unit 150. The device parameter 146 can include a device characteristic such as the device resolution, frame rate, color scale, black and white or color properties of the display device 140 that are stored in control unit 150 of the mobile video device 110. In addition, optional control module 147 of transceiver module 130 operates in a similar fashion to control module 148 to generate channel characteristics 144 that can also be provided to edge device 122 via mobile device feedback 112 and to decoder 152. For instance, the device parameters of a mobile video device 110 may be a high resolution and the channel characteristics and power state of the device are sufficient to support this high resolution. In this case, mobile device feedback 112 can optionally indicate the device parameters 146, channel characteristics 144 and/or power state to a network module such as edge device 122 that generates video signal 109 corresponding to the mobile device feedback 112 that is received. Video decoder 152 operates to decode the video signal 109 to generate decoded video signal 154 based on the particular device parameters 146 and channel characteristics 144.

If however, control module 148 of transceiver module 130 determines that the channel conditions do not support a high quality signal, mobile device feedback 112 can optionally indicate this to edge device 122 that generates video signal 109 with reduced color depth, resolution, frame rate, bandwidth, etc. In this circumstance, video decoder receives an indication via channel characteristics 144 and decodes video signal 109 accordingly.

In a further embodiment of the present invention, the control unit 150 determines the state of the device, such as a power state and can adjust the one or more device parameters 146 in response. In this fashion, the control unit can control the video decoder 152 to a lower frame rate, lower color scale or to black and white operation, to a reduced resolution and/or to other state corresponding to a reduced power state that may include reduced processor speed and reduced computational abilities, shutting down one or more MIMO channels of the transceiver 130 or otherwise reducing the reception bandwidth, et cetera. These changes in reception and decoding based on the reduced power state can save processing power and help increase battery life.

In addition, video decoder 152 optionally generates a decoder feedback parameter 149 based on an amount or frequency of decoder errors. The decoder feedback parameter 149 is supplied to control unit 150 and can be used by the control unit 150 to determine the state of the device and to adjust the one or more device parameters 146 in response. In this fashion, the control unit can control the video decoder 152 to a lower frame rate, lower color scale or to black and white operation, to a reduced resolution and/or to other state to control the decoder feedback to an acceptable level so that the video player can play the video signal 109 in accordance with the these device parameters. Decoder feedback 149 can be included in device parameter 146 that is sent as mobile device feedback 112 to edge device 122.

Video decoder 152 can be implemented in hardware, software or firmware. In particular embodiments, the video decoder 152 can be implemented using one or more microprocessors, micro-controllers, digital signal processors, microcomputers, central processing units, field programmable gate arrays, programmable logic devices, state machines, logic circuits, analog circuits, digital circuits, and/or any devices that manipulates signals (analog and/or digital) based on operational instructions that are stored in a memory module. When video decoder 152 is implemented with two or more devices, each device can perform the same steps, processes or functions in order to provide fault tolerance or redundancy. Alternatively, the function, steps and processes performed by video decoder 136 can be split between different devices to provide greater computational speed and/or efficiency. The associated memory module may be a single memory device or a plurality of memory devices. Such a memory device may be a read-only memory, random access memory, volatile memory, non-volatile memory, static random access memory (SRAM), dynamic random access memory (DRAM), flash memory, cache memory, and/or any device that stores digital information. Note that when the video decoder 152 implements one or more of its functions via a state machine, analog circuitry, digital circuitry, and/or logic circuitry, the memory module storing the corresponding operational instructions may be embedded within, or external to, the circuitry comprising the state machine, analog circuitry, digital circuitry, and/or logic circuitry.

Figure 6:
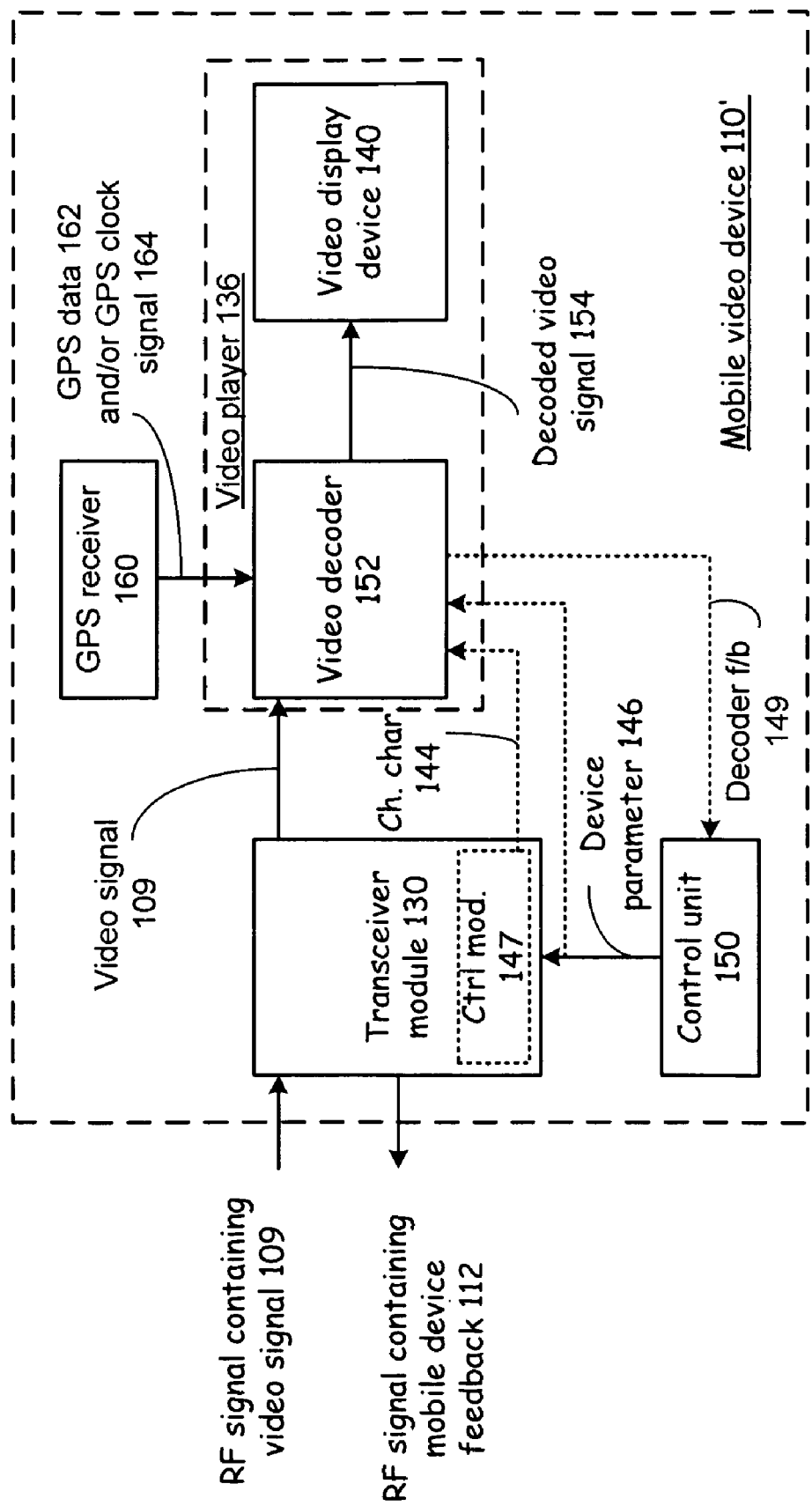

FIG. 6 presents a block diagram representation of a mobile video device 110' in accordance with another embodiment of the present invention. In particular, mobile device 110' includes many similar elements of mobile device 110 presented in conjunction with FIG. 5 that are referred to by common reference numerals. In addition, mobile device 110' includes a GPS receiver 160 that generates GPS data 162 that can be supplied to edge device 122 as mobile device feedback 112 and optionally used by video decoder 152 for authentication of the video signal 109. GPS clock signal 164 can be used as a global clock signal for synchronizing the timing of mobile video device 110' and edge device 122, and for controlling the timing of the decoding and playback of video signal 109. As discussed in conjunction with FIG. 3, the presence of GPS receiver 160 and/or the receipt of current GPS data 162 or GPS clock signals 164 can be used by mobile device 110' to trigger mobile device feedback 112 sent to edge device 122 that indicates the availability of GPS data in the mobile device for the purposes of timing and/or authentication.

In an embodiment of the present invention, the video signal 109 is encoded with timings that is based on GPS signals or some other global clock. Mobile video device 110' generates its own local GPS signals that include GPS clock signals 164. Video decoder 152 decodes the video signal 109 based on local timing generated from GPS clock signals 164. In addition, the decoder can measure one or more timing parameters such as a network jitter parameter, and a network latency parameter, by comparing the local timing generated from GPS clock signals and the timing of the video signal 109 generated by encoding the video signal based on GPS clock signals at the edge device 122. In response, video decoder can adjust a buffer size, such as a de-jitter buffer used in the video decoder 152 or the transceiver module 130 based on the network jitter parameter, increasing the buffer size when greater network jitter is indicated and reducing the buffer size when less network jitter is indicated.

As discussed in conjunction with FIG. 3, edge device 122 can use timing data derived from GPS signals 126 to generate authentication data included in video signal 109. In particular, edge device 122 can obtain real-time clock signals such as a time and that can be embedded as authentication data in the video signal 109. In an embodiment of the present invention, decoder 152 includes an authentication routine that compares the time and date from the authentication data of video signal 109 to its own time and date, generated locally by GPS receiver 160. If the time and date included in the authentication data compare favorably to locally generated timing (such as when the difference between the locally generated time and date and the authentication is less than an authentication threshold, the video signal 109 can be authenticated and the playback of video signal by mobile video device 110 can be enabled. If however, the time and date included in the authentication data vary from the locally generated time and date by more than the authentication threshold, the playback of video signal 109 by mobile video device 110 can be disabled.

As further discussed in conjunction with FIG. 3, location data received via mobile device feedback 112 can be used to generate location-based authentication data that is embedded in the video signal 109. Video decoder 152 can include an authentication routine that compares the location data from the authentication data of video signal 109 to its own location data, such as GPS data 162 generated by GPS receiver 260. If the location data included in the authentication data compares favorably to GPS data 162 the video signal 109 can be authenticated and the playback of video signal 109 by mobile video device 110 can be enabled. If however, the location data included in the authentication data varies from the GPS data 162 by more than an authentication threshold such as 1 mile, 5 miles or some greater or lesser distance based on the desired level of security, the playback of the video signal 109 by the mobile video device 110 can be disabled.

Figure 7:
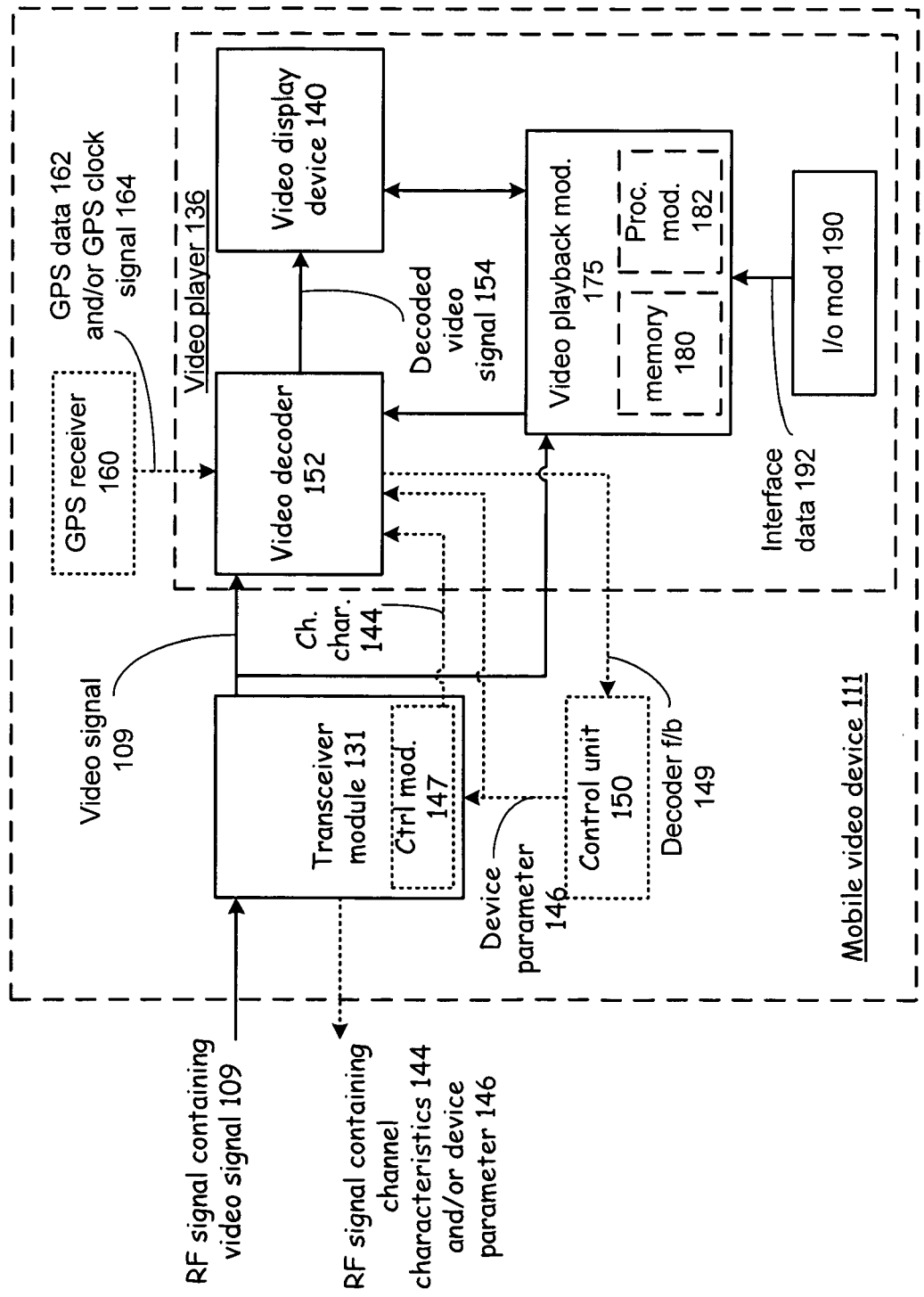

FIG. 7 presents a block diagram representation of a mobile video device 111 in accordance with another embodiment of the present invention. In particular, mobile video device 111 includes many similar elements to mobile devices 110 and 110' described in conjunction with FIGS. 6 and 7 that are referred to by common reference numerals. Further, mobile device can include the many functions and features of mobile devices 110 and 110'. In addition, mobile device 111 includes a input/output module 190 and a video playback module 175 having a memory 180 and processing module 182 that executes an application for storing selected video signals 109 as a plurality of stored video files and playing back these video files. Input/output module 190 is a user interface module that includes one or more buttons, a keyboard, keypad, a click wheel, touch screen, a microphone, speaker and/or other user interface devices that allow the video playback module 175 to interact with the user by providing prompts either directly or via screen displays that are generated by video playback module 175 and displayed on video display device 140, to receive commands and other interface data 192 in response to actions of a user of mobile video device 111.

In an embodiment of the present invention, processing module 182 can be implemented using one or more microprocessors, micro-controllers, digital signal processors, microcomputers, central processing units, field programmable gate arrays, programmable logic devices, state machines, logic circuits, analog circuits, digital circuits, and/or any devices that manipulates signals (analog and/or digital) based on operational instructions that are stored in a memory module, such as memory 180. When processing module 182 is implemented with two or more devices, each device can perform the same steps, processes or functions in order to provide fault tolerance or redundancy. Alternatively, the function, steps and processes performed by processing module 182 can be split between different devices to provide greater computational speed and/or efficiency. The associated memory module may be a single memory device or a plurality of memory devices. Such a memory device may be a read-only memory, random access memory, volatile memory, non-volatile memory, static random access memory (SRAM), dynamic random access memory (DRAM), flash memory, cache memory, and/or any device that stores digital information. Note that when the processing module 182 implements one or more of its functions via a state machine, analog circuitry, digital circuitry, and/or logic circuitry, the memory module storing the corresponding operational instructions may be embedded within, or external to, the circuitry comprising the state machine, analog circuitry, digital circuitry, and/or logic circuitry.

In operation, video playback module 175 can receive commands from a user to store a video signal 109 as a digital video file in memory 180. The user can also navigate the stored video files and a select a stored video file for playback. During playback, processing module 182 converts the stored video file to a video signal that is provided to video decoder 152 that operates as described in conjunction with a received video signal 109 to generate a decoded video signal 154 for display on display device 140. I/O module 190 optionally provides one or more playback control buttons such as stop, pause, fast forward, rewind, slow motion, etc., that generate interface data 192 used by processing module 182 to control the playback of a stored video file in response to user commands. In addition, video playback module 175 generates navigation data for each stored video file that can be used in a video navigation routine that allows a user to select a stored video file for playback based on the navigation data and based on interface data 192 generated in response to the action of a user.

In an embodiment of the present invention, the navigation data includes a still image or video clip, such as an opening shot, a title shot, an opening clip or other still image or video clip derived from the one of the plurality of stored video files or some other graphics object or graphics data such as an icon, animation, or other graphical representation. The navigation data is stored in association with the corresponding stored video file and used to generate selectable prompts displayed on video display device 140, such as thumbnail clips or images of the stored video files. These selectable prompts can then be selected by the user via a touch screen, pointer or other selection mechanism of I/O module 190.

Further navigation data for the stored video files can include text derived from the one of the plurality of stored video files. For instance, the audio track of a stored video file can be processed by processing module 182 using a speech recognition routine to generate text such as keywords or phrases that are indexed and stored as navigation data in association with the corresponding stored video file. In particular, some portion or all of an audio track is converted to sound signals that are processed by the speech recognition engine with recognized words being stored, indexed as navigation data associated with the stored video file that contains the audio track. Similarly, the text from close captioning data or text-based metadata such as title and content information that is received in conjunction with video signal 109 can be indexed and stored as navigation data. In these embodiments, a user can search for a particular stored video file by inputting a search term, keyword or other text that is compared with the navigation data for the stored video files to find one or more matches.

In an embodiment of the present invention, input/output module 190 includes a microphone and the user of mobile video device 111 can verbally enter interface data 192 such as commands and other input that is translated by a speech recognition routine of processing module 182. In particular, text associated with particular stored video file that the user wishes to search for can be entered by speaking the particular word or words to the device. The speech recognition routine can convert these spoken words to text that is used to locate one or more matching stored video files based on their associated navigation data. In addition, other commands such as "search", "play", "pause", etc. can be entered by the user as speech commands that are recognized by the speech recognition routine. In one implementation, a speaker independent speech recognition routine is implemented that can be used for both generating navigation data for stored video filed based on their associated audio track and for converting user speech to search text and commands. Alternatively, a speaker dependent speech recognition routine can be implemented for interpreting user speech that operates based on training sets or other learned data for a particular user.

Figure 8:
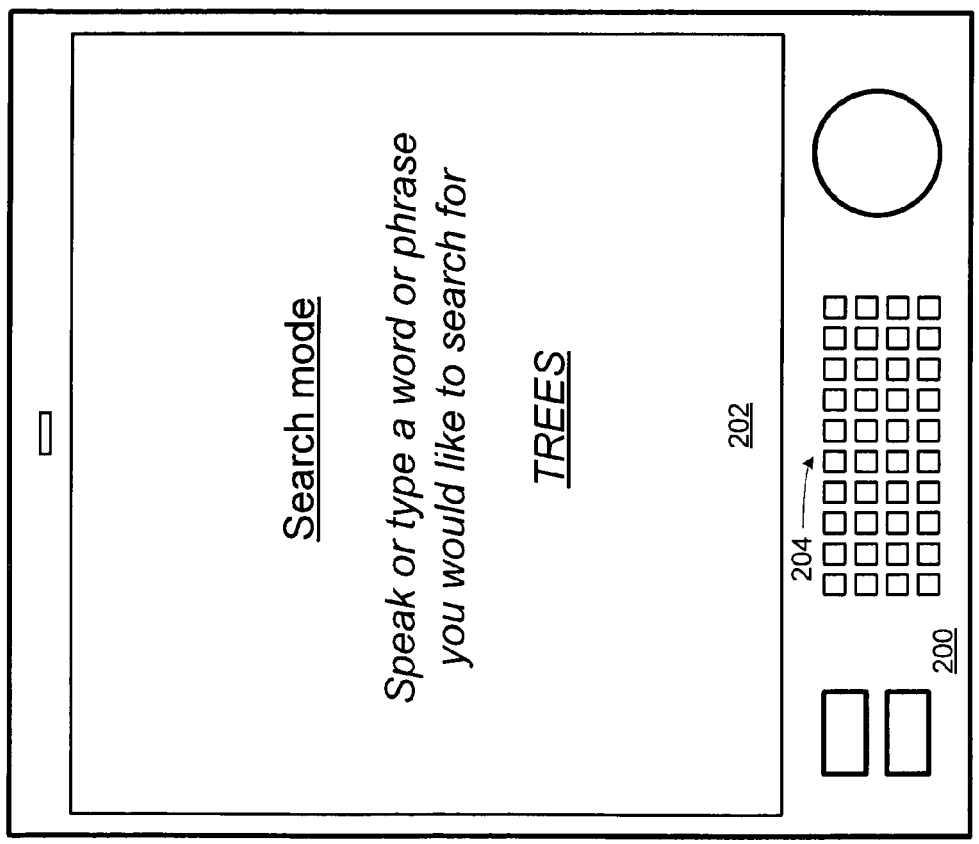

FIG. 8 presents a pictorial representation of a mobile device 200 in accordance with another embodiment of the present invention. In particular a mobile device 200 is shown, such as mobile video device 110, 110' or 111 with a particular screen shot on a display screen 202, such as video display device 140, relating to a search mode of the device used for locating stored video files associated with a particular text search string. In this mode of operation the user is prompted to enter a word or phrase, either by speaking the word or typing it on keypad 204. In this case, the user has entered to word "Trees" and is searching for a stored video file containing video content relating to trees.

Figure 9:
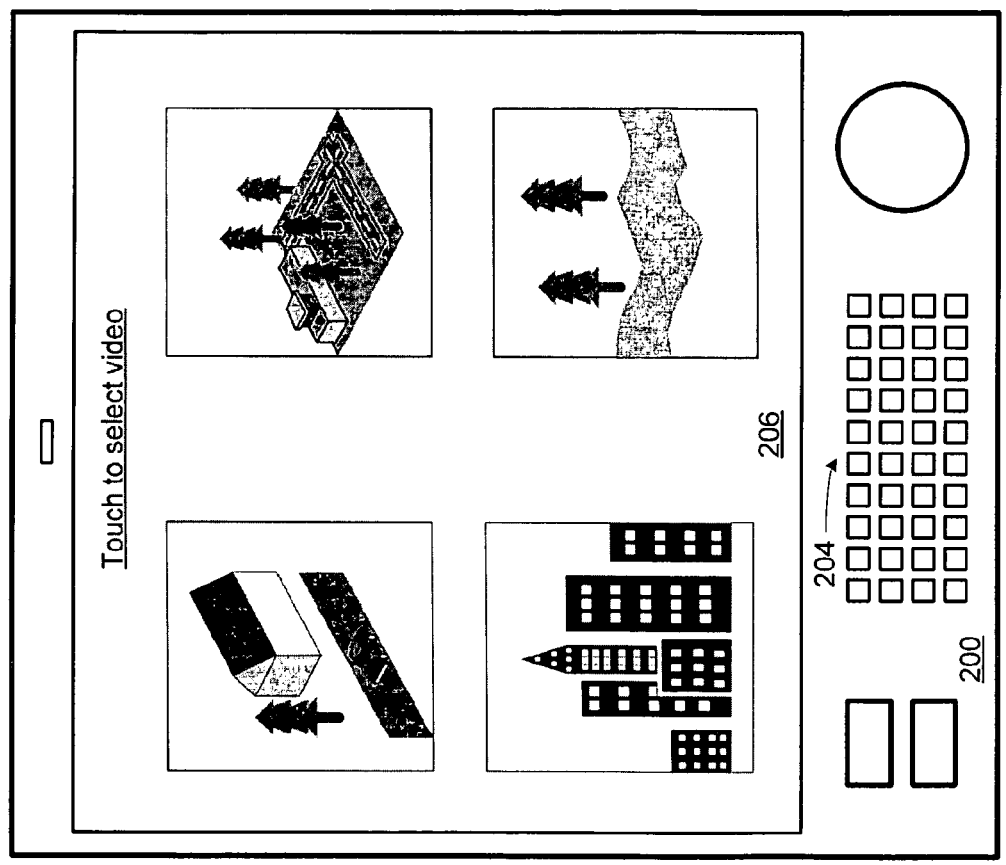

FIG. 9 presents a pictorial representation of a mobile device 200 in accordance with another embodiment of the present invention. In particular, a further example screen shot is shown relating wherein mobile device 200 includes a touch screen. In this example, screen shot 206 of video display device 140 displays four images such as video clips or still images that are generated from navigational data stored in conjunction with four corresponding stored video files. The user selects a particular one of the four stored video files for playback by touching the image on the touch screen that correspond to the stored video file that the user wishes to play.

In an embodiment of the present invention, the particular four stored video were chosen based on a search routine run by processing module 182 on the text entered from screen shot 202 of FIG. 8. In particular, when the user entered to the search string "trees" the search routine searched text portions of navigational data associated with the stored video files to locate stored video files having text that included the word "trees". In the alternative or in addition, the still images and/or video clips included in the navigational data associated with the stored video files can be used directly as a search tool to present indications of stored video files for selection by the user.

Figure 10:
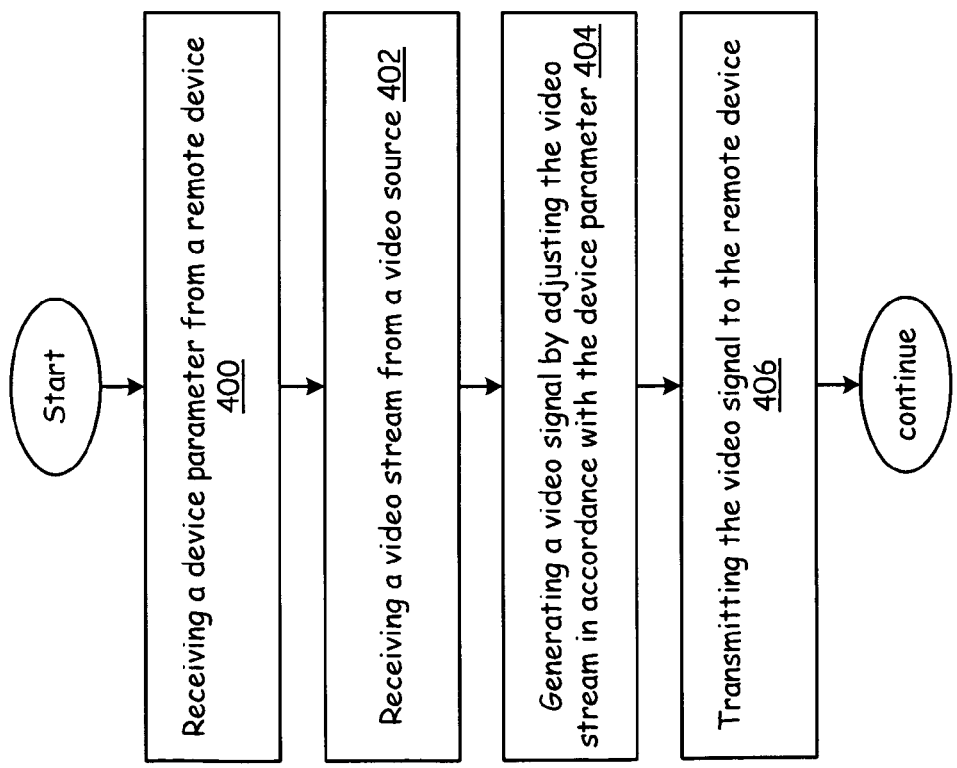
FIG. 10 is a flowchart representation of a method in accordance with the present invention.

FIG. 10 is a flowchart representation of a method in accordance with the present invention. In particular, a method is presented for use in conjunction with one or more of the functions and features described in conjunction with FIGS. 1-9. In step 400, a device parameter is received from a remote device. In step 402, a video stream is received from a video source. In step 404, video signal is generated by adjusting the video stream in accordance with the device parameter. In step 406, the video signal is transmitted to the remote device.

In an embodiment of the present invention, the device parameter can include a device resolution, a screen size, a display setting, a decoding error feedback parameter and/or a power state of the remote device. Step 404 can include adjusting the video stream based on a duration of the video stream so that the entire video stream can be viewed by the remote device, based on the power state, transcoding the video stream from a first video format to a second video format, and/or adjusting at least one of: the frame rate, the pacing, the bandwidth, and the color depth.

Figure 11:
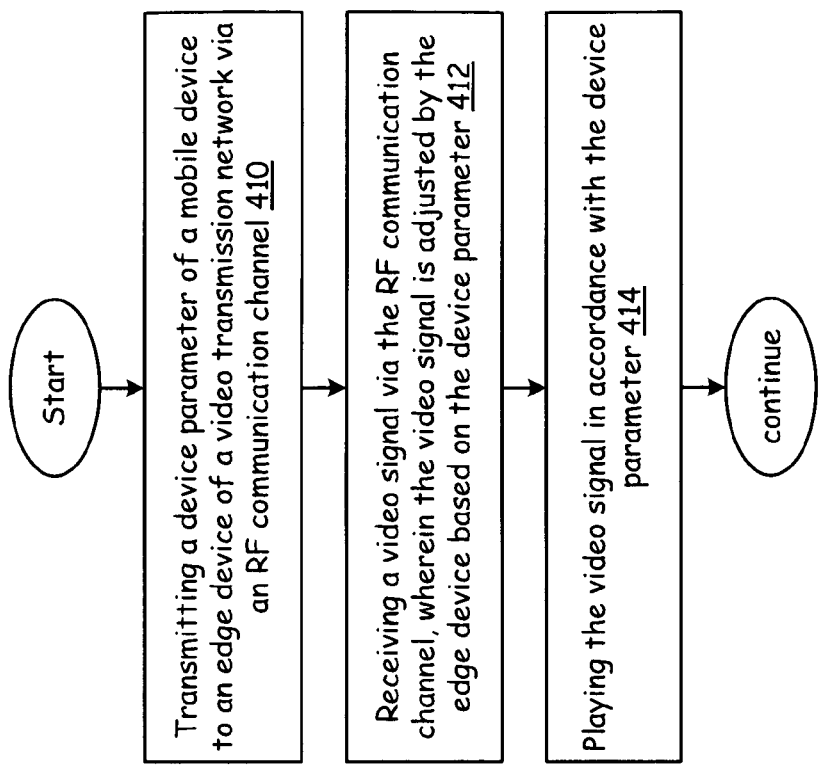
FIG. 11 is a flowchart representation of a method in accordance with the present invention.

FIG. 11 is a flowchart representation of a method in accordance with the present invention. In particular, a method is presented for use in conjunction with one or more of the functions and features described in conjunction with FIGS. 1-10. In step 410, a device parameter of a mobile device is transmitted to an edge device of a video transmission network via an RF communication channel. In step 412, a video signal is received via the RF communications channel, wherein the video signal is adjusted by the edge device based on the device parameter. In step 414, the video signal is played in accordance with the device parameter.

In an embodiment of the present invention, the device parameter includes at least one of: a device resolution, a screen size, a display setting and/or a power state of the remote device. Step 414 can include generating a decoding feedback error parameter based on a decoding of the video signal and the device parameter can also include the decoding error feedback parameter.

Figures 12, 13:
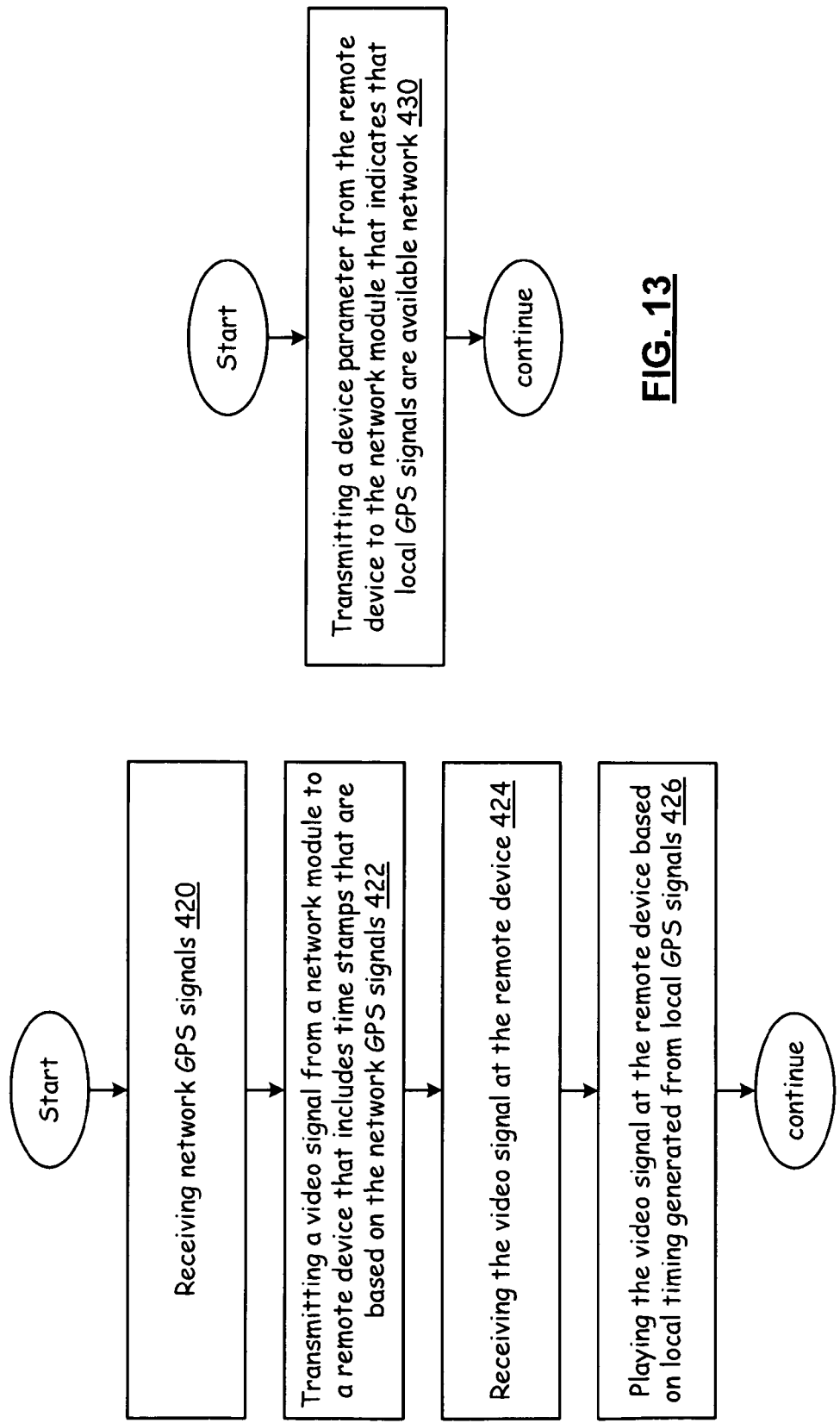
FIG. 12 is a flowchart representation of a method in accordance with the present invention.
FIG. 13 is a flowchart representation of a method in accordance with the present invention.

FIG. 12 is a flowchart representation of a method in accordance with the present invention. In particular, a method is presented for use in conjunction with one or more of the functions and features described in conjunction with FIGS. 1-11. In step 420, network global positioning system (GPS) signals are received. In step 422, a video signal is transmitted from a network module to a remote device that includes time stamps that are based on the network GPS signals. In step 424, the video signal is received at a remote device. In step 426, the video signal is played at the remote device based on local timing generated from local GPS signals. In an embodiment of the present invention, the network GPS signals are received from a GPS receiver.

FIG. 13 is a flowchart representation of a method in accordance with the present invention. In particular, a method is presented for use in conjunction with one or more of the functions and features described in conjunction with FIGS. 1-12 and in particular with the method of FIG. 12. In step 430, a device parameter is transmitted from the remote device to the network module that indicates that local GPS signals are available. In an embodiment of the present invention, the network module includes the time stamps that are based on the network GPS signals when the device parameter indicates that local GPS signals are available. Further, the network module can reduce the frequency of the time stamps when the device parameter indicates that local GPS signals are available.

Figure 14:
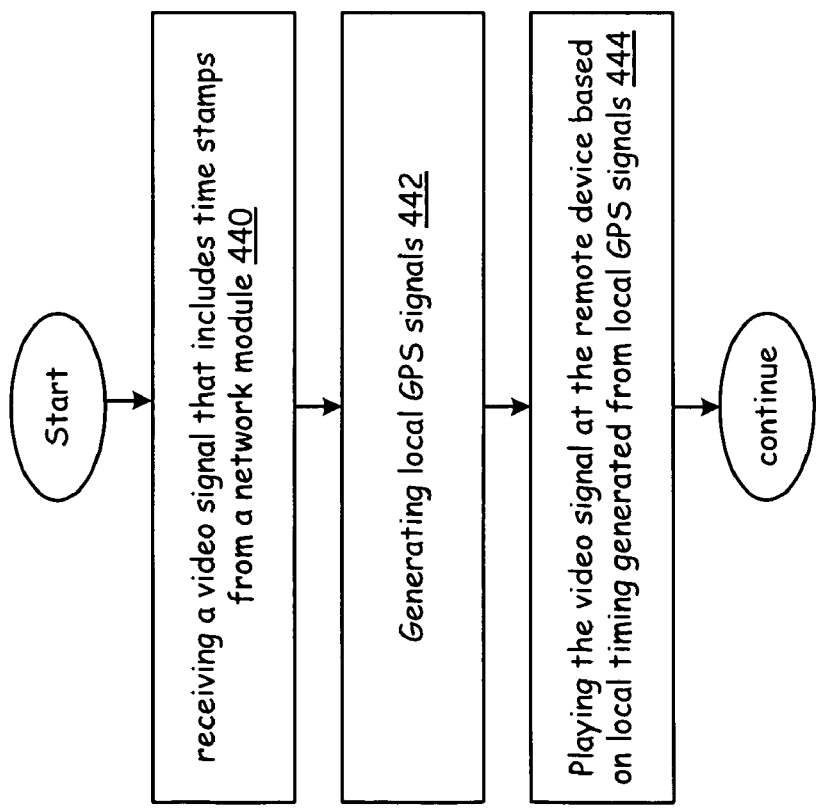
FIG. 14 is a flowchart representation of a method in accordance with the present invention.

FIG. 14 is a flowchart representation of a method in accordance with the present invention. In particular, a method is presented for use in conjunction with one or more of the functions and features described in conjunction with FIGS. 1-13. In step 440, a video signal is received that includes time stamps from a network module. In step 442, local GPS signals are generated. In step 44, the video signal is played based on local timing generated from GPS signals.

Figure 15:
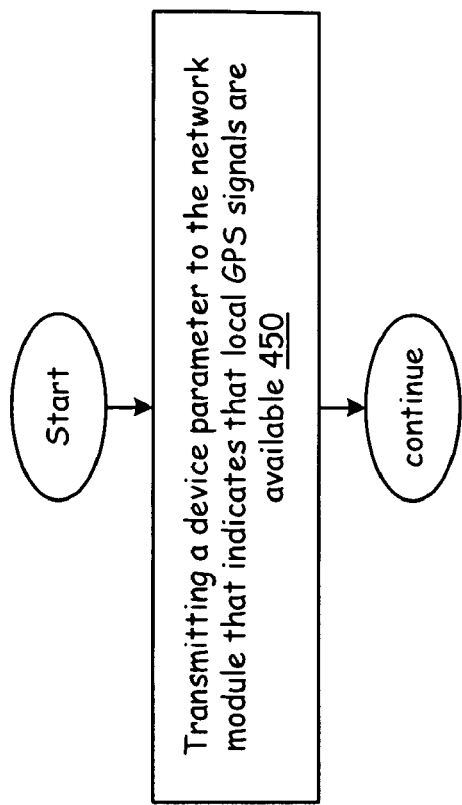
FIG. 15 is a flowchart representation of a method in accordance with the present invention.

FIG. 15 is a flowchart representation of a method in accordance with the present invention. In particular, a method is presented for use in conjunction with one or more of the functions and features described in conjunction with FIGS. 1-14 and in particular in conjunction with the method of FIG. 14. In step 450, a device parameter is transmitted to the network module that indicates that local GPS signals are available.

Figure 16:
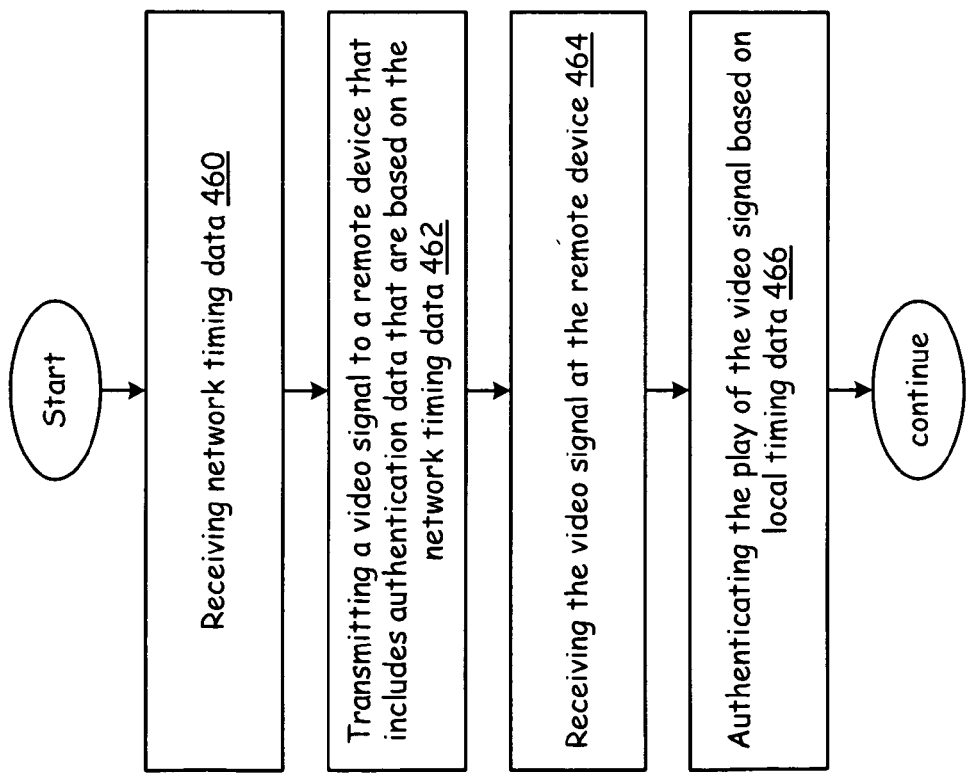
FIG. 16 is a flowchart representation of a method in accordance with the present invention.

FIG. 16 is a flowchart representation of a method in accordance with the present invention. In particular, a method is presented for use in conjunction with one or more of the functions and features described in conjunction with FIGS. 1-15. In step 460, network timing data is received. In step 462, a video signal is transmitted to a remote device that includes authentication data that is based on the network timing data. In step 464, the video signal is received at the remote device. In step 466, the play of the video signal is authenticated based on local timing data.

In an embodiment of eth present invention, the network timing data is received at an edge device and/or received from a GPS receiver. In step 466, the play of the video signal can be authenticated by comparing the authentication data to the local timing data, and can be authenticated when the difference between the authentication data and the local timing data compares favorably to an authentication threshold. The local timing data can be generated by a GPS receiver.

Figure 17:
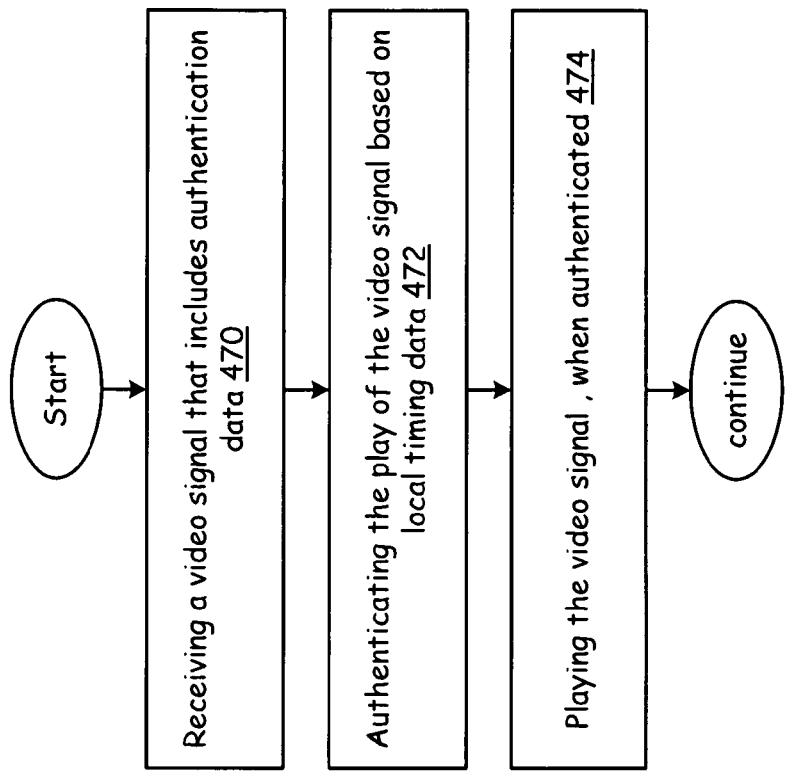
FIG. 17 is a flowchart representation of a method in accordance with the present invention.

FIG. 17 is a flowchart representation of a method in accordance with the present invention. In particular, a method is presented for use in conjunction with one or more of the functions and features described in conjunction with FIGS. 1-16. In step 470, a video signal is received that includes authentication data. In step 472, the play of the video signal is authenticated based a local timing data. In step 474, the video signal is played, when authenticated.

In an embodiment of the present invention, step 424 authenticates the play of the video signal by comparing the authentication data to the local timing data and can authenticate the play of the video signal when the difference between the authentication data and the local timing data compares favorably to an authentication threshold.

Figure 18:
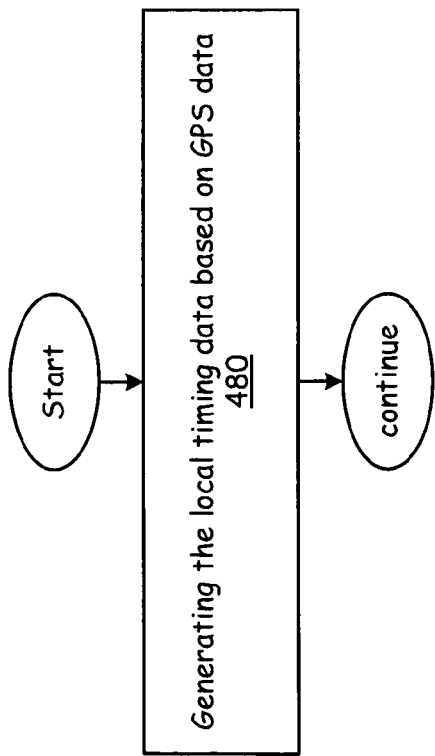
FIG. 18 is a flowchart representation of a method in accordance with the present invention.

FIG. 18 is a flowchart representation of a method in accordance with the present invention. In particular, a method is presented for use in conjunction with one or more of the functions and features described in conjunction with FIGS. 1-17 and in particular for use with the method of FIG. 17. In step 480, the local timing data is generated based on GPS data.

Figure 19:
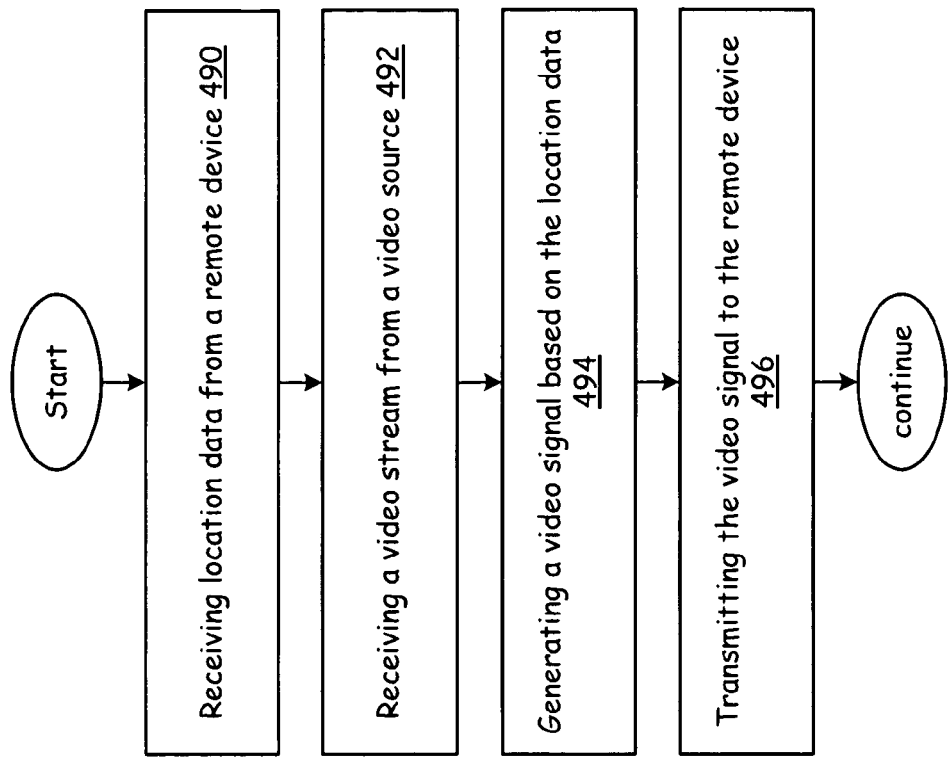
FIG. 19 is a flowchart representation of a method in accordance with the present invention.

FIG. 19 is a flowchart representation of a method in accordance with the present invention. In particular, a method is presented for use in conjunction with one or more of the functions and features described in conjunction with FIGS. 1-18. In step 490, location data is received from a remote device. In step 492, a video stream is received from a video source. In step 494, a video signal is generated based on the location data. In step 496, the video signal is transmitted to the remote device.

In an embodiment of the present invention, the network module includes an edge device. Step 494 can include adjusting a format of the video signal based on the location data and/or generating authentication data based on the location data and embedding the authentication data in the video signal.

Figure 20:
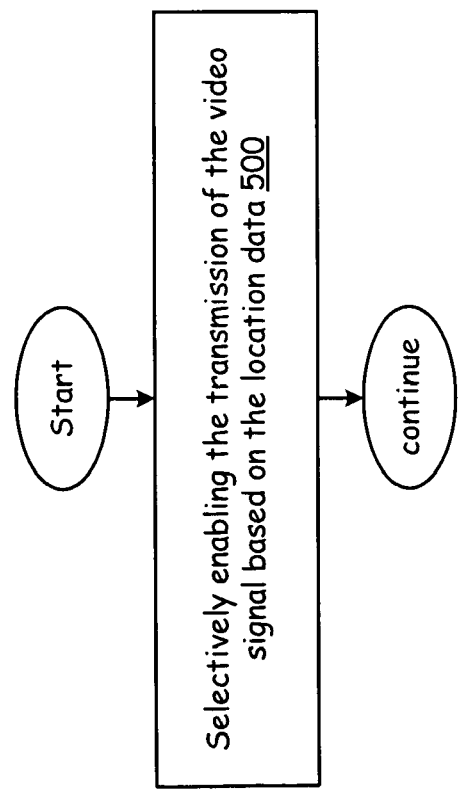
FIG. 20 is a flowchart representation of a method in accordance with the present invention.

FIG. 20 is a flowchart representation of a method in accordance with the present invention. In particular, a method is presented for use in conjunction with one or more of the functions and features described in conjunction with FIGS. 1-19 and in particular for use in conjunction with the method of FIG. 19. In step 500, the transmission of the video signal is selectively enabled based on the location data.

Figure 21:
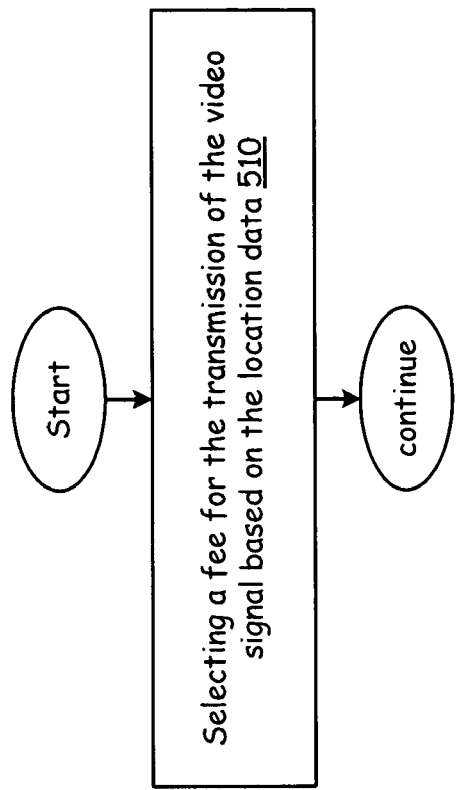
FIG. 21 is a flowchart representation of a method in accordance with the present invention.

FIG. 21 is a flowchart representation of a method in accordance with the present invention. In particular, a method is presented for use in conjunction with one or more of the functions and features described in conjunction with FIGS. 1-19 and in particular for use in conjunction with the method of FIGS. 19 and 20. In step 510, a fee for the transmission of the video signal is selected based on the location data.

FIG. 22 is a flowchart representation of a method in accordance with the present invention. In particular, a method is presented for use in conjunction with one or more of the functions and features described in conjunction with FIGS. 1-9. In step 520, location data is generated. In step 522, the location data is transmitted to a network module. In step 524, a video signal is received from the network module over at least one RF communications channel, wherein the video signal is adjusted based on the location data. In step 526, the video signal is played.

In an embodiment of the present invention, the network module adjusts a format of the video signal based on the location data. In addition, the video signal can include authentication data based on the location data.

FIG. 23 is a flowchart representation of a method in accordance with the present invention. In particular, a method is presented for use in conjunction with one or more of the functions and features described in conjunction with FIGS. 1-22 and in particular in conjunction with the method of FIG. 22. In step 530, the play of the video signal is authenticated by comparing the authentication data and the location data.

Figure 24:
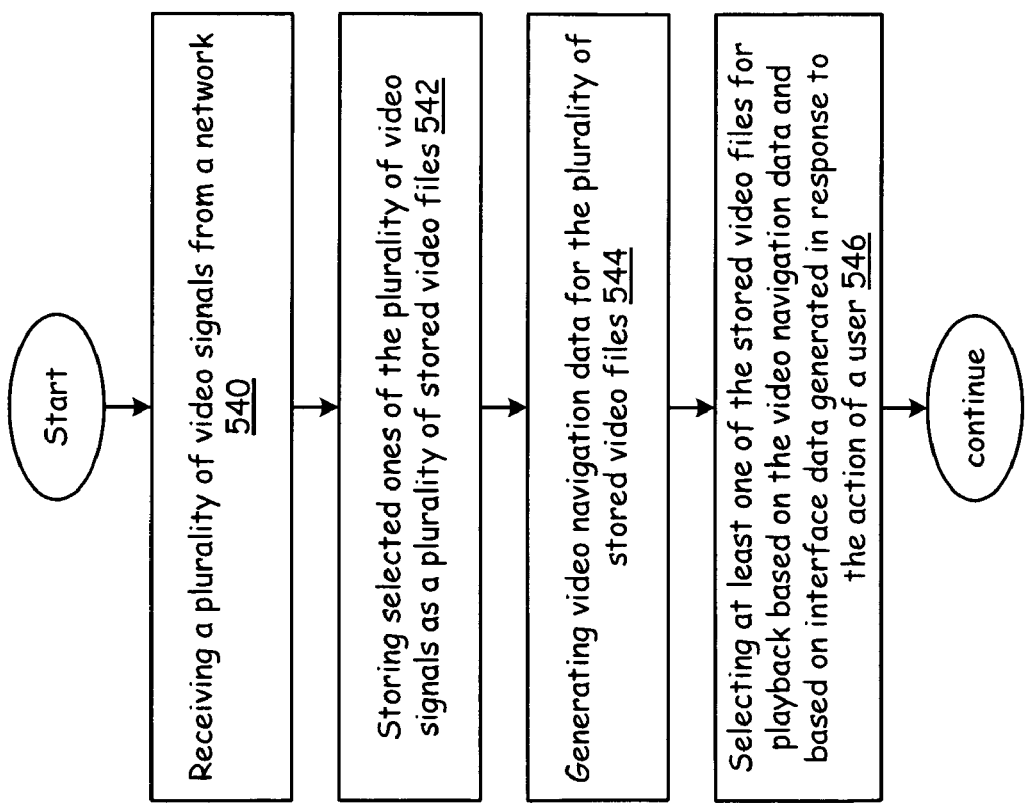
FIG. 24 is a flowchart representation of a method in accordance with the present invention.

FIG. 24 is a flowchart representation of a method in accordance with the present invention. In particular, a method is presented for use in conjunction with one or more of the functions and features described in conjunction with FIGS. 1-23. In step 540, a plurality of video signals are received from a network. In step 542, selected ones of the plurality of video signals are stored as a plurality of stored video files. In step 544, video navigation data is generated for the plurality of stored video files. In step 546 at least one of the stored video files is selected for playback based on the video navigation data and based on interface data generated in response to the action of a user.

In an embodiment of the present invention, the video navigation data for one of the plurality of stored video files includes a still image derived from the one of the plurality of stored video files, a video clip derived from the one of the plurality of stored video files, and/or text derived from the one of the plurality of stored video files and/or graphics data, a graphics object. In addition, the navigation data can be generated based on a speech recognition of an audio track from the one of the plurality of stored video files, based on closed captioning data from the one of the plurality of stored video files or based on metadata from the one of the plurality of stored video files.

In an embodiment of the present invention, the interface data is generated by the user touching a touch screen in response to a display of the navigation data that includes at least one of: a video clip and a still image, based a speech recognition of spoken words of the user, and/or based a speech recognition of spoken commands of the user.

Figure 25:
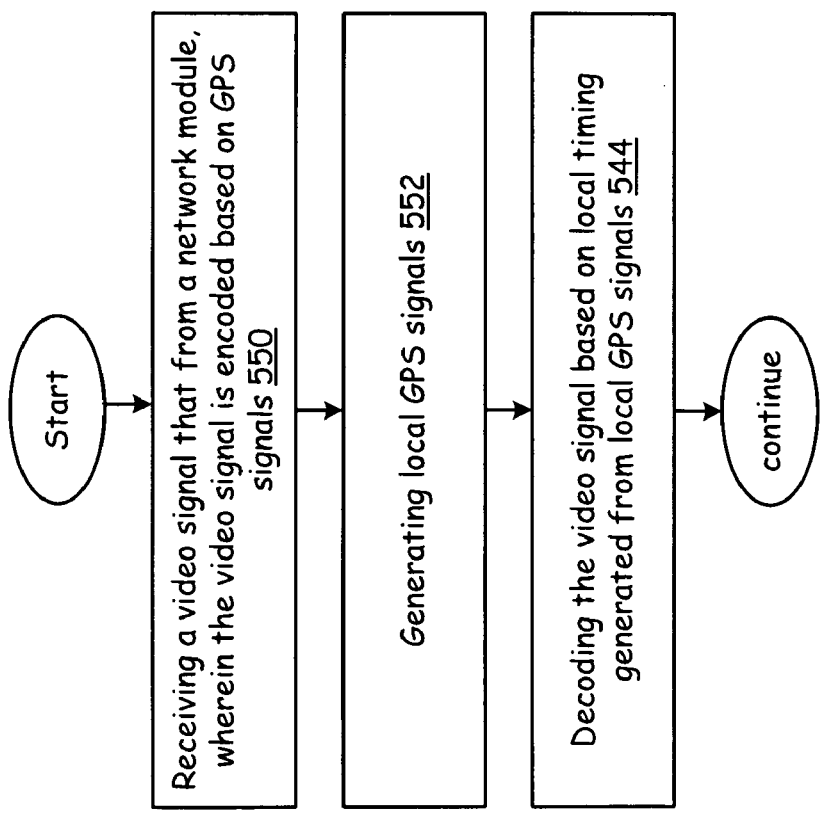
FIG. 25 is a flowchart representation of a method in accordance with the present invention.

FIG. 25 is a flowchart representation of a method in accordance with the present invention. In particular, a method is presented for use in conjunction with one or more of the functions and features described in conjunction with FIGS. 1-24. In step 550, a video signal is received from a network module, wherein the video signal is encoded based on GPS signals. In step 552, local GPS signals are generated. In step 554, the video signal is decoded based on local timing generated from local GPS signals.

Figure 26:
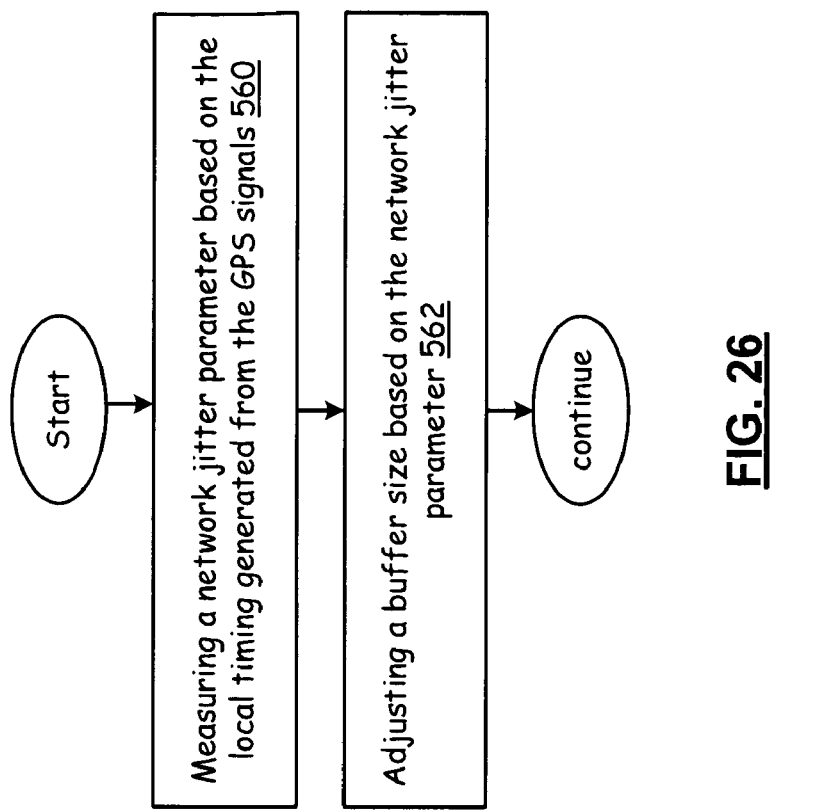
FIG. 26 is a flowchart representation of a method in accordance with the present invention.

FIG. 26 is a flowchart representation of a method in accordance with the present invention. In particular, a method is presented for use in conjunction with one or more of the functions and features described in conjunction with the method of FIG. 25. In step 560, a network jitter parameter is measured based on the local timing generated from GPS signals. In step 562, a buffer size is adjusted based on the network jitter parameter.

While the foregoing description of a global clock has centered on the use of a GPS clock signal, other global clock signaling, real-time or otherwise, can likewise be used. In particular other RF global clock signals can be used in accordance with the present invention. Further, while the foregoing description has focused on the transmission of video signals 109 to a mobile video device, such as mobile video device 110, 110' or 111, likewise other video devices, such as set-top boxes, video players, televisions or other video devices can likewise be used in accordance with the present invention.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "coupled to" and/or "coupling" and/or includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" indicates that an item includes one or more of power connections, input(s), output (s), et cetera., to perform one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, et cetera, provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

What is claimed is:

1. A video transmission system comprising:
   a transceiver module that receives feedback from a mobile device, wherein the feedback includes current channel characteristics, current power state of the mobile device, characteristics of the mobile device and location data of the mobile device, the location data includes a location of the mobile device at a first time, the transceiver module transmits a video signal to the mobile device via a network; and
   a network module includes an edge device, coupled to the transceiver module, the edge device receives a video stream from a video source and the feedback from the mobile device; the edge device generates the video signal based on the location data by generating authentication data that includes the location of the mobile device at the first time and embedding the authentication data in the video signal, wherein the mobile device enables playback of the video signal based on the authentication data, wherein the edge device generates the video signal by dynamically adjusting format of the video signal based on the current channel characteristics and the current power state of the mobile device included in the feedback;
   wherein the mobile device compares current location of the mobile device at current time to the location of the mobile device at the first time indicated by the authentication data and enables playback of the video signal when the current location of the mobile device at the current time varies from the location of the mobile device at the first time indicated by the authentication data by less than an authentication threshold.

2. The video transmission system of claim 1 wherein network module selects a fee for the transmission of the video signal based on the location data.

3. A method comprising:
   receiving, at a transceiver module, feedback from a mobile device, wherein the feedback includes current channel characteristics, current power state of the mobile device, characteristics of the mobile device and location data of the mobile device, wherein the location data includes a location of the mobile device at a first time;
   receiving, at a network module includes an edge device coupled to the transceiver module, a video stream from a video source and the feedback from the mobile device;
   generating, at the edge device, a video signal based on the location data by generating authentication data that includes the location of the mobile device at the first time and embedding the authentication data in the video signal;
   transmitting, by the transceiver module, the video signal from the edge device to the mobile device via a network, therein the mobile device enables playback of the video signal based on the authentication data; and
   comparing, at the mobile device, current location of the mobile device at current time to the location of the mobile device at the first time indicated by the authentication data and enabling playback of the video signal when the current location of the mobile device at the current time varies from the location of the mobile device at the first time indicated by the authentication data by less than an authentication threshold;

wherein generating, at the edge device, the video signal by dynamically adjusting format of the video signals based on the current channel characteristics and the current power state of the mobile device included in the feedback.

4. The method of claim 3 further comprising: selecting, at the network module, a fee for the transmission of the video signal based on the location data.

* * * * *